(12) United States Patent
Yamazaki

(10) Patent No.: US 7,623,267 B2
(45) Date of Patent: Nov. 24, 2009

(54) IMAGE PROCESSING METHOD, APPARATUS AND PROGRAM

(75) Inventor: Yoshirou Yamazaki, Ashigara-Kami-Gun (JP)

(73) Assignee: Fujifilm Corporation, Tokyo (JP)

( * ) Notice: Subject to any disclaimer, the term of this patent is extended or adjusted under 35 U.S.C. 154(b) by 864 days.

(21) Appl. No.: 11/135,382

(22) Filed: May 24, 2005

(65) Prior Publication Data
US 2005/0259885 A1      Nov. 24, 2005

(30) Foreign Application Priority Data
May 24, 2004   (JP)   ............................ 2004-153609

(51) Int. Cl.
*G06K 15/00* (2006.01)
(52) U.S. Cl. ...................... 358/3.03; 382/252; 382/253; 382/254; 345/616
(58) Field of Classification Search ............... 358/3.03; 382/252; 345/616
See application file for complete search history.

(56) References Cited

U.S. PATENT DOCUMENTS

| 5,642,439 | A | * | 6/1997 | Sato et al. .................... 382/254 |
| 5,815,286 | A | * | 9/1998 | Matsuba et al. ............. 358/3.19 |
| 6,081,349 | A | * | 6/2000 | Ebitani et al. ............... 358/3.19 |
| 6,204,934 | B1 | * | 3/2001 | Minamino .................... 358/1.9 |
| 6,437,877 | B1 | * | 8/2002 | Takei .......................... 358/1.9 |
| 7,170,639 | B1 | * | 1/2007 | Dittrich et al. .............. 358/3.01 |
| 7,268,919 | B2 | * | 9/2007 | Katsuyama ................. 358/3.03 |

FOREIGN PATENT DOCUMENTS

JP       08214159 A       8/1996

* cited by examiner

*Primary Examiner*—Mark K Zimmerman
*Assistant Examiner*—Dung D Tran
(74) *Attorney, Agent, or Firm*—Birch, Stewart, Kolasch & Birch, LLP

(57) ABSTRACT

The image processing method for obtaining a quantized image from a multiple tone image, the method comprises: an image dividing step of dividing an input image into a plurality of image blocks of a unit block size; a threshold value matrix specification step of specifying threshold value matrices for the input image with respect to each of the image blocks from a plurality of threshold value matrices including a first threshold value matrix having the unit block size and a second threshold value matrix dividable into a plurality of sub-matrices each having the unit block size; and a threshold value matrix setting step of setting threshold value matrices in image blocks for which the second threshold value matrix has been specified as the threshold value matrix, in such a manner that adjacent positional relationships between sub-matrices formed when the second threshold value matrix is divided into sub-matrix units are preserved.

9 Claims, 23 Drawing Sheets

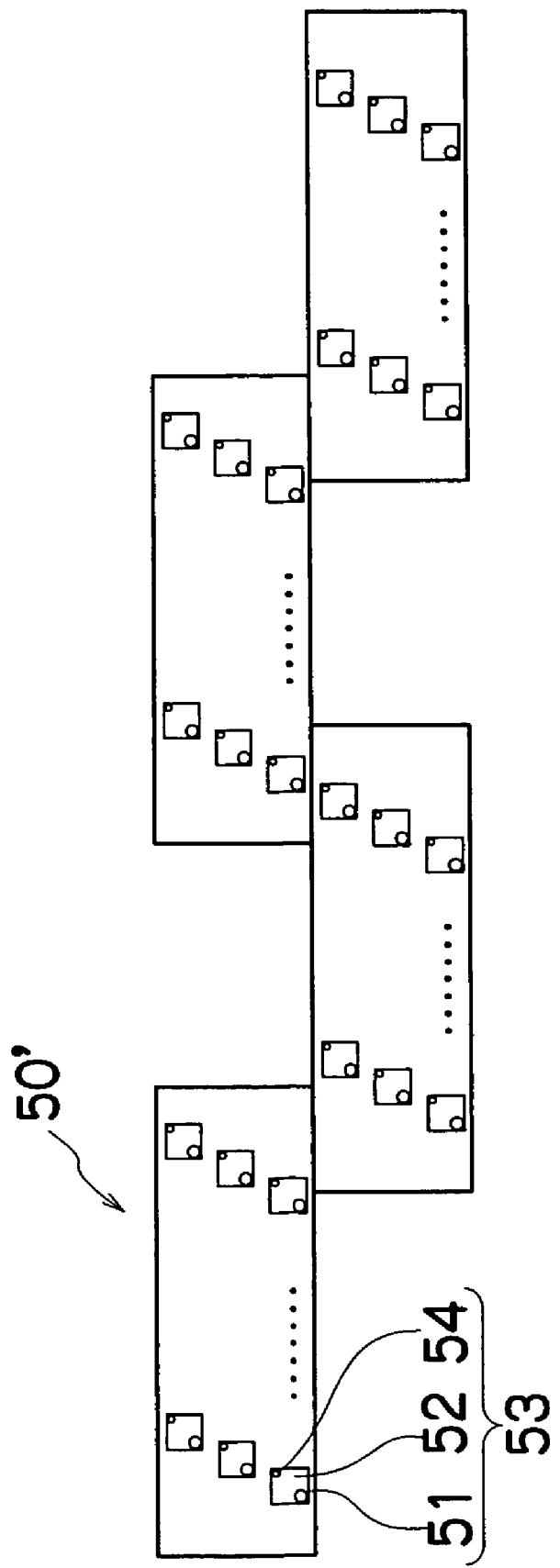

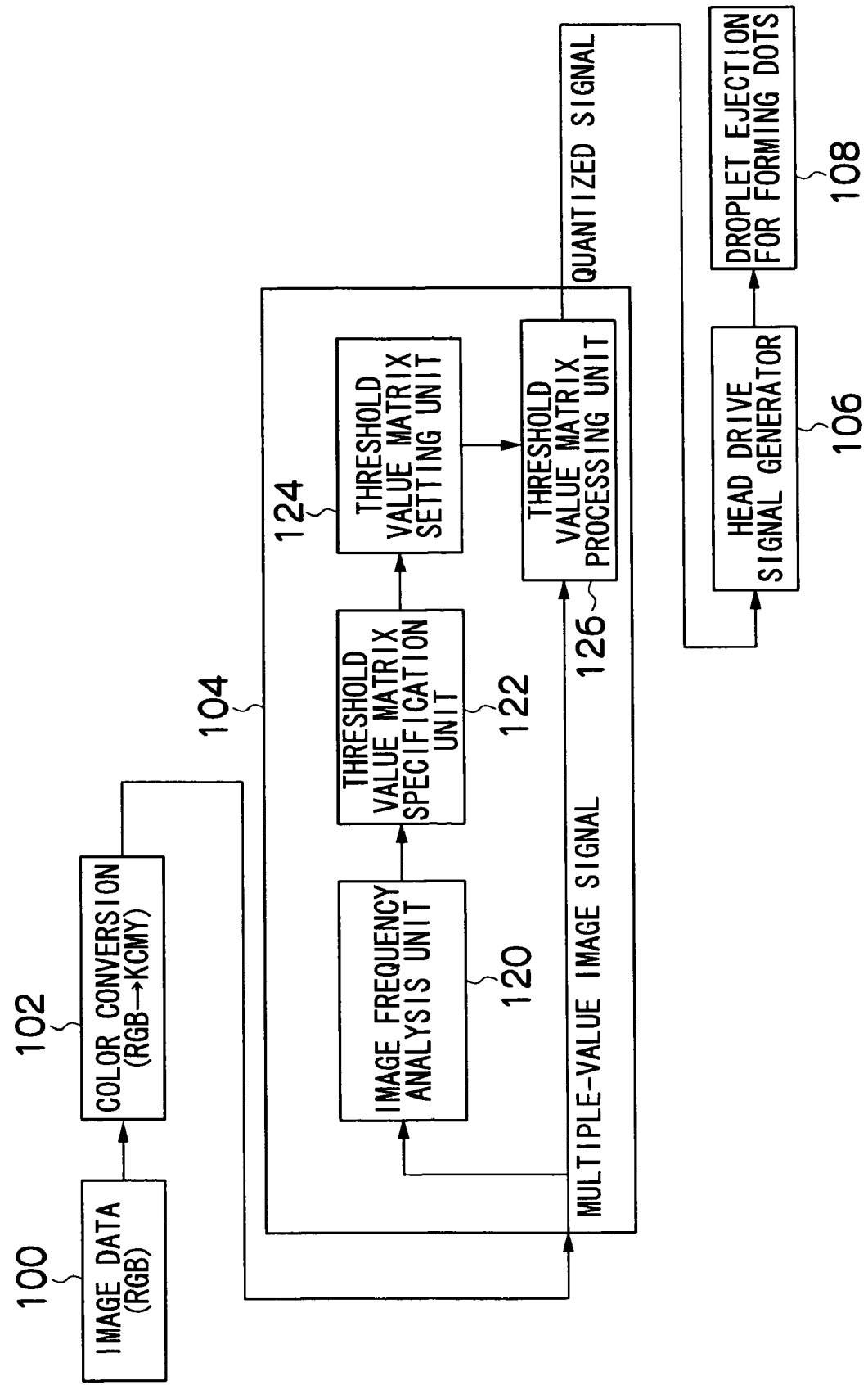

FIG.13

→ COLUMN

↓ ROW

210 ↓

| L11 | L12 | L13 | L14 | L11 | L12 | L13 | L14 |
|-----|-----|-----|-----|-----|-----|-----|-----|
| L21 | L22 | L23 | L24 | L21 | L22 | L23 | L24 |
| L31 | L32 | L11 | L12 | L31 | L32 | L33 | L34 |
| L41 | L42 | L43 | L44 | L41 | L42 | L43 | L44 |
| L11 | L12 | L13 | L14 | L11 | L12 | L13 | L14 |
| L21 | L22 | L23 | L24 | L21 | L22 | L23 | L24 |
| L31 | L32 | L33 | L34 | L31 | L32 | L33 | L34 |
| L41 | L42 | L43 | L44 | L41 | L42 | L43 | L44 |

FIG.15

| | | | | | | | | | | | |
|---|---|---|---|---|---|---|---|---|---|---|---|
| L11 | HL8 | HL1 | HL1 | HL2 | L12 | HL8 | HL1 | HL2 | L12 | L13 | L14 |
| L21 | HL7 | H11 | H11 | HL3 | L22 | HL7 | H11 | HL3 | L22 | L23 | L24 |
| L31 | HL6 | HL5 | HL5 | HL4 | M11 | HL6 | HL5 | HL4 | H11 | L33 | L34 |
| L41 | L42 | L43 | L44 | L41 | M21 | M22 | L44 | L41 | L42 | L43 | L44 |
| L11 | L12 | ML8 | ML1 | ML1 | ML2 | L13 | L14 | ML8 | ML1 | ML1 | ML2 |
| L21 | L22 | ML7 | M11 | M12 | ML3 | L23 | L24 | ML7 | M12 | M11 | ML3 |
| L31 | L32 | ML7 | M21 | M22 | ML3 | L33 | L34 | ML7 | M22 | M21 | ML3 |
| L41 | L42 | ML6 | ML5 | ML5 | ML4 | L43 | L44 | ML6 | ML5 | ML5 | ML4 |

COLUMN → / ROW ↓

| | COLUMN → | | | | | | | 260 ↙ |
|---|---|---|---|---|---|---|---|---|
| ↓ ROW | | | | | | | | |

| L11 | L12 | L13 | L14 | L11 | L12 | L13 | L14 |
|---|---|---|---|---|---|---|---|
| L21 | ML8 | ML1 | ML1 | ML2 | L22 | L23 | L24 |
| L31 | ML7 | M11 | M12 | ML3 | L32 | L33 | L34 |
| L41 | ML6 | ML5 | ML5 | ML4 | L42 | L43 | L44 |
| L11 | L12 | L13 | L14 | L11 | L12 | L13 | L14 |
| L21 | L22 | L23 | L24 | L21 | L22 | L23 | L24 |
| L31 | L32 | L33 | L34 | L31 | L32 | L33 | L34 |
| L41 | L42 | L43 | L44 | L41 | L42 | L43 | L44 | ns
IMAGE PROCESSING METHOD, APPARATUS AND PROGRAM

BACKGROUND OF THE INVENTION

1. Field of the Invention

The present invention relates to an image processing method and apparatus, and to a program for realizing image processing functions in a computer, and more particularly, to quantization processing technology for a multiple-value image suitable for an inkjet recording apparatus or other image forming apparatus.

2. Description of the Related Art

In general, in an inkjet recording apparatus, a graded tonal image is formed by converting the light and shade of the image into an appropriate dot pattern, by using a half-toning method, such as error diffusion, dithering, or the like.

Here, a half-toning process relating to the prior art will be described. The most widely used techniques in half-toning are error diffusion and dithering.

Error diffusion is a method based on processing the errors generated when each dot (pixel) of a multiple-value image is quantized, and reflecting and diffusing these errors into the pixels surrounding the target pixel (the pixel being processed). The error may be distributed into the surrounding pixels in a uniform manner (without applying weighting), or it may be distributed by applying a weighting to the subsequently processed pixels, by means of a prescribed error diffusion matrix.

On the other hand, dithering is a method which sets a threshold value matrix comprising n×n threshold values, superimposes this threshold value matrix on the image, and then compares the shade level of each of the corresponding pixels with a threshold value. If the shade value of the input pixel is greater than the threshold value, then the pixel is taken to have a value of 1 and if it is smaller than the threshold value, then it is taken to have a value of 0; thereby the input image is binarized. When the processing of the n×n pixels has completed, the threshold value matrix is moved progressively to the position of the next n×n pixels, and the same processing is repeated. The threshold value matrix may also be known as a dithering matrix, or the like.

In general, the quality of the processed image varies greatly with the error diffusion matrix or threshold value matrix that is used. For example, if an error diffusion matrix or a threshold value matrix having a broad range of distribution is used, then it is possible to reproduce portions of the image having a smooth variation in density distribution, in a satisfactory manner, but in portions where the density distribution changes suddenly, the response declines and such satisfactory results cannot be obtained. Furthermore, a long processing time is required, since a large number of multiply and accumulation operations are made.

On the other hand, if an error diffusion matrix or threshold value matrix having a narrow distribution range is used, then image reproduction is good in portions of the image where there is a sudden change in density.

Japanese Patent Application Publication No. 8-214159 proposes a method in which a spatial frequency or a characteristic quantity corresponding to the spatial frequency is sampled for each pixel of an input image, a plurality of error diffusion matrices are prepared if using an error diffusion method, or a plurality of threshold value matrices are prepared if using a dithering method, and quantization processing is carried out by selecting the optimum error diffusion matrix or threshold value matrix in accordance with the characteristic quantity, thereby obtaining a good binary image which satisfies human visual perception characteristics.

More specifically, three threshold value matrices as illustrated in FIGS. 23A to 23C are prepared, and an optimum threshold value matrix is selected from these three threshold value matrices in accordance with the characteristic quantity (in this case, the spatial frequency) sampled from the target pixel.

FIG. 23A shows a threshold value matrix block 201, in which high-frequency threshold value matrices (H) 200 are arranged in four rows in the column direction (vertical direction or y direction) and in four rows in the row direction (horizontal direction or x direction). FIG. 23B shows a threshold value matrix block 203, in which medium-frequency threshold value matrices (M) 202 are arranged in two rows in the column direction and two rows in the row direction, and FIG. 23C shows a low-frequency threshold value matrix (L) 204. The high-frequency threshold value matrices 200 have a narrow error distribution range (in other words, few threshold values), and the low-frequency threshold value matrix 204 has a broad error distribution range (in other words, a large number of threshold values). The medium-frequency threshold value matrices 204 are situated at an intermediate point between the high-frequency threshold value matrices 200 and the low-frequency threshold value matrices 204.

The high-frequency threshold value matrices 200 shown in FIG. 23A each have a size of m×m (where m is a natural number); the medium-frequency threshold value matrices 202 shown in FIG. 23B each have a size of (2×m)×(2×m) (i.e., a size four times greater than that of the high-frequency threshold value matrices 200), and the low-frequency threshold value matrix 204 shown in FIG. 23C has a size of (4×m)× (4×m) (i.e., a size sixteen times greater than that of the high-frequency threshold value matrices 200).

In an image in which a plurality of pixels are arranged in the column direction and the row direction, it is determined which spatial frequency range the image of certain pixels under examination (a pixel block containing the pixels under examination) belongs to, from the density values of the pixels (pixel block) under examination, and one of the threshold value matrices suited to that spatial frequency range is selected and set.

The threshold value for a pixel under examination is determined from the threshold value matrix thus set, and the density value of the pixel under examination is compared with the determined threshold value. If the density value of the pixel under examination is equal to or greater than the threshold value, then the value of the pixel under examination is taken to be 1, and if the density value of the pixel under examination is less than the threshold value, then the value of the pixel under examination is taken to be 0. The similar processing is carried out successively for each pixel or each pixel block, and a dot arrangement for a binary image is thus established.

With regard to the size of the three threshold value matrices disclosed in Japanese Patent Application Publication No. 8-214159, the size of the largest matrix, namely, the low-frequency threshold value matrix 204, is taken as the basic unit, and the size of each high-frequency threshold value matrix 200 is set to 1/16 of the size of the low-frequency threshold value matrix 204, while the size of the medium-frequency threshold value matrix 202 is set to 1/4 of the size of the low-frequency threshold value matrix 204. Quantization processing is carried out by combining these matrices in a suitable manner.

However, since the calculation becomes complicated if threshold value matrices of different sizes are used in this way, the other threshold value matrices are adapted to the size of the low-frequency threshold value matrix 204 by forming a threshold value matrix block 203 comprising an arrangement of four medium-frequency threshold value matrices 202, and a threshold value matrix block 201 comprising an arrangement of 16 high-frequency threshold value matrices 200, and hence the threshold value corresponding to a pixel under examination can be calculated by using a 4×4 size threshold value matrix at all times.

In the example of an image 410 shown in FIG. 24, the image is divided into six regions 412 to 422, and an optimum threshold value matrix is-established for each region. The low-frequency threshold value matrix 204 is selected for regions 412, 414 and 416, the medium-frequency threshold value matrices 202 (threshold value matrix block 203) are selected for regions 418 and 420, and the high-frequency threshold value matrices 200 (threshold value matrix block 201) are selected for region 422.

If the image is quantized by changing between different threshold value matrices within one image in this way, then a problem arises in that the processing may not necessarily appropriate for an image in which the spatial frequency characteristics change within a region, for instance, if there is a sudden change in density within region 412.

SUMMARY OF THE INVENTION

The present invention has been contrived with the foregoing circumstances in view, an object thereof being to provide an image processing method and apparatus, and a program for achieving the functions thereof by means of a computer, whereby quantization is performed appropriately in accordance with changes in a characteristic quantity of the input image, and hence a desirable quantized image can be obtained.

In order to attain the aforementioned object, the present invention is directed to an image processing method for obtaining a quantized image from a multiple tone image, the method comprising: an image dividing step of dividing an input image into a plurality of image blocks of a unit block size; a threshold value matrix specification step of specifying threshold value matrices for the input image with respect to each of the image blocks from a plurality of threshold value matrices including a first threshold value matrix having the unit block size and a second threshold value matrix dividable into a plurality of sub-matrices each having the unit block size; and a threshold value matrix setting step of setting threshold value matrices in image blocks for which the second threshold value matrix has been specified as the threshold value matrix, in such a manner that adjacent positional relationships between sub-matrices formed when the second threshold value matrix is divided into sub-matrix units are preserved.

According to the present invention, a plurality of threshold value matrices used in quantization processing for obtaining a quantized image from a multiple tone image are provided, and this plurality of threshold value matrices includes at the least a first threshold value matrix having the size of a unit block, and a second threshold value matrix which can be split into sub-matrices each having the size of a unit block. The input image is divided up into regions of the unit block size (the size of the first threshold value matrix), and a threshold value matrix is specified from the plurality of threshold value matrices for each of these image blocks. If the second threshold value matrix is specified as the threshold value matrix for an image block, then the second threshold value matrix is divided into sub-matrices and the threshold value matrices for the image blocks are set in sub-matrix units while preserving the adjacent positional relationships (the arrangement sequence and positions) of the sub-matrices created by dividing the threshold value. Since binarization processing is carried out using threshold value matrices which are set in this manner, it is possible to obtain a quantized image which responds to sudden changes in characteristics in the input image, while at the same time, it is also possible to obtain a desirable quantized image in which the reproduction of the tonal gradation of the input image is maintained.

In general, the smaller the size of the threshold value matrix, the lower the number of graduated tones which can be reproduced in the quantized image, but the greater the spatial resolution of the image. If there is a sudden change in the characteristics of the input image, then it is necessary to increase the spatial resolution in order to reflect this change in the quantized image. On the other hand, if the change in characteristics is a gentle change, then it is desirable to increase the number of reproducible tones. Therefore, a first threshold value matrix of unit block size (namely, a threshold value matrix of small size) is used in regions where there is a sudden change in characteristics, and a second threshold value matrix divided into sub-matrices (namely, a threshold value matrix of large size) is used in regions where there is a gentle change in characteristics, in such a manner that the adjacent positional relationships between the sub-matrices obtained by dividing the threshold value matrix are preserved. In this way, by reducing the units in which the threshold value matrices are set, and using at least two threshold value matrices in a selective fashion, it is possible to divide up the image into regions where the number of tones is prioritized and regions where the spatial resolution is prioritized, and to carry out suitable quantization processing according to each type of region.

The second threshold value matrix may also include a plurality of threshold value matrices. More specifically, the number of threshold value matrices used in the present image processing may be two, or it may be three or above.

The input image is, for instance, a digital image which is treated as a collection (arrangement) of pixels, the pixel being the minimum information unit, in which a graduated tone value (a value indicating the degree of light or shade) corresponding to the image contents is assigned to each pixel.

Besides binarization processing, the quantization processing may include ternarization processing, quaternarization processing, or the like, in which the density varies while using the same pixel (dot) size.

Preferably, the image processing method further comprises: a characteristic quantity calculation step of calculating a characteristic quantity of each of the plurality of image blocks, wherein the threshold value matrix specification step specifies the threshold value matrix for each of the plurality of image blocks in accordance with the characteristic quantity calculated in the characteristic quantity calculation step.

Since the characteristic quantity of the image block into which the input image is divided is calculated and the threshold value matrix of the image block is decided according to this characteristic quantity, then it is possible to specify an optimum threshold value matrix for each image block.

When determining the characteristic quantity of an image block, it is possible to find the characteristic quantity of the image block with respect to a region that is larger than the image block, and it is also possible to find the characteristic quantity with respect to a region that is smaller than the image block. A region larger than the image block may include all or a portion of the surrounding image blocks, or it may include all or a portion of the adjacent image blocks.

Preferably, the characteristic quantity calculation step calculates the characteristic quantity of each of the plurality of image blocks under examination according to the characteristic quantity of the image block under examination and the characteristic quantities of adjacent image blocks which are adjacent to the image block under examination.

Since a composition is adopted in which threshold value matrix of a block under examination is determined according to the characteristic quantity of the image block under examination and the characteristic quantities of the image blocks adjacent to this block under examination, then it is possible to specify a more desirable threshold value matrix which accounts for the characteristic quantities of the adjacent blocks.

The block under examination is an image block which includes at least the pixel under examination that is currently being processed.

The image blocks adjacent to the block under examination may include all of the image blocks adjacent to the block under examination, or they may include a portion of the image blocks adjacent to the block under examination.

Preferably, the threshold value matrix specification step specifies the threshold value matrix of the image block under examination according to the characteristic quantity of the image block under examination as calculated in the characteristic quantity calculation step, and the threshold value matrices set for adjacent image blocks which are adjacent to the image block under examination.

Since the threshold value matrices of the adjacent image blocks which have already been set are taken into account, in addition to the characteristic quantity of the block under examination, when specifying the threshold value matrix for the block under examination, then it is possible to preserve the arrangement (positional) relationships of the threshold value matrices between adjacent pixel blocks.

Preferably, there is a third threshold value matrix used when there is a difference in the characteristic quantity between adjacent image blocks; and the threshold value matrix specification step specifies the threshold value matrix of an adjacent image block as the third threshold value matrix if there is a difference between the characteristic quantity of the image block under examination and the characteristic quantity of the adjacent image block.

If there is a change in the characteristic quantity between adjacent blocks, then a threshold value matrix suitable to a change in the characteristic quantity is specified, and therefore, the dots can be arranged in a smooth fashion in a region where the characteristics of the input image change.

Preferably, the characteristic quantity of each of the plurality of image blocks which is calculated in the characteristic quantity calculation step includes a spatial frequency obtained by converting the image signal contained in each of the image blocks into a spatial frequency.

With respect to the relationship between the number of identifiable tones and the spatial frequency, the number of identifiable tones is lower in regions where the spatial frequency is high, and the number of identifiable tones is greater in regions where the spatial frequency is low. Therefore, the spatial frequency of each image block is determined, and the threshold value matrix is specified in accordance with the spatial frequency thus determined.

Preferably, the first threshold value matrix includes a high-frequency threshold value matrix used when the spatial frequency of the image block is a high frequency, and the second threshold value matrix includes a low-frequency threshold value matrix used when the spatial frequency of the image block is a low frequency.

The image blocks are classified into low-frequency blocks and high-frequency blocks according to the spatial frequency of each image block, and by using a threshold value matrix suited to each type of region, it is possible to achieve a more desirable quantized image.

In low-frequency blocks where the spatial frequency is low, the density of the input image changes gently and although it does not matter if the spatial resolution is low, it is necessary to reproduce a large number of tones. Therefore, a large number of threshold values are required in the threshold value matrix and hence the threshold value matrix becomes larger in size.

On the other hand, in a high-frequency block where the spatial frequency is high, the density of the input image changes suddenly and although it does not matter if the number of reproducible tones is low, it is necessary to increase the spatial resolution. Therefore, it is acceptable for the threshold value matrix to have a small number of threshold values, and hence the size of the threshold value matrix is reduced.

Desirably, the second threshold value matrix comprises, in addition to a low-frequency threshold value matrix, a medium-frequency threshold value matrix which corresponds to a medium-frequency range between the high-frequency and low-frequency ranges.

In order to attain the aforementioned object, the present invention is also directed to an image processing apparatus which obtains a quantized image from a multiple tone image, the apparatus comprising: a threshold value matrix storage device which stores a plurality of threshold value matrices including at least a first threshold value matrix having a unit block size and a second threshold value matrix dividable into a plurality of sub-matrices each having the unit block size; an image dividing device which divides an input image into a plurality of image blocks of a unit block size; a threshold value matrix specification device which specifies threshold value matrices for the input image with respect to each of the image blocks from the plurality of threshold value matrices stored in the threshold value matrix storage device; and a threshold value matrix setting device which sets threshold value matrices in image blocks for which the second threshold value matrix has been specified as the threshold value matrix, in such a manner that adjacent positional relationships between sub-matrices formed when the second threshold value matrix is divided into sub-matrix units are preserved.

This image processing apparatus may be applied to an image forming apparatus, such as an inkjet recording apparatus, and this image forming apparatus comprises an ejection head in which nozzles for ejecting liquid droplets are formed, and an ejection control device for controlling the ejection from the ejection head according to the quantized image data obtained by the image processing apparatus, in such a manner that it can form an image on a recording medium by means of liquid droplets ejected from the nozzles.

A compositional example of an ejection head is a full line type inkjet head having a nozzle row in which a plurality of nozzles for ejecting ink are arranged through a length corresponding to the full width of the recording medium.

In this case, a mode may be adopted in which a plurality of relatively short ejection head blocks having nozzles rows which do not reach a length corresponding to the full width of the recording medium are combined and joined together, thereby forming nozzle rows of a length that correspond to the full width of the recording medium.

A full line type inkjet head is usually disposed in a direction that is orthogonal to the relative feed direction (relative conveyance direction) of the recording medium, but modes may also be adopted in which the inkjet head is disposed following an oblique direction that forms a prescribed angle with respect to the direction orthogonal to the conveyance direction. "Recording medium" indicates a medium on which an image is recorded by means of the action of the ejection head (this medium may also be called an ejection receiving medium, print medium, image forming medium, image receiving medium, or the like). This term includes various types of media, irrespective of material and size, such as continuous paper, cut paper, sealed paper, resin sheets, such as OHP sheets, film, cloth, a printed circuit board on which a wiring pattern, or the like, is formed by means of an ejection head, and an intermediate transfer medium, and the like.

The conveyance device for causing the recording medium and the ejection head to move relative to each other may include a mode where the recording medium is conveyed with respect to a stationary (fixed) recording ejection, or a mode where an ejection head is moved with respect to a stationary recording medium, or a mode where both the ejection head and the recording medium are moved.

In order to attain the aforementioned object, the present invention is also directed to a computer readable medium having embodied thereon an image processing program for obtaining a quantized image from a multiple tone image by a computer, the image processing program comprising: a first code segment for an image dividing step of dividing an input image into a plurality of image blocks of a unit block size; a second code segment for a threshold value matrix specification step of specifying threshold value matrices for the input image with respect to each of the image blocks from a plurality of threshold value matrices including a first threshold value matrix having the unit block size and a second threshold value matrix dividable into a plurality of sub-matrices each having the unit block size; and a third code segment for a threshold value matrix setting step of setting threshold value matrices in image blocks for which the second threshold value matrix has been specified as the threshold value matrix, in such a manner that adjacent positional relationships between sub-matrices formed when the second threshold value matrix is divided into sub-matrix units are preserved.

The medium may be a propagated signal, which may be a carrier wave.

The above-described image processing apparatus can be realized by means of a computer, and the present invention provides a program for causing a computer to realize the various devices of the image processing apparatus described above (or alternatively, it provides a program for causing a computer to execute the various steps of the above-described image processing method).

The program for image processing according to the present invention may be used as an operating program of a central processing unit (CPU) incorporated into an image output device, such as a printer or display device, and it may also be used in a computer system, such as a personal computer. Furthermore, the program for image processing according to the present invention may be constituted by independent applicational software, or it may be incorporated as a part of an application, such as the driver software, image editing software, or the like.

According to the present invention, a plurality of threshold value matrices including at least a first threshold value matrix of a unit block size and a second threshold value matrix dividable into the unit block size are prepared, and threshold value matrices are specified for the input image divided into the unit block size, with respect to each unit block, the second threshold value matrix being divided into sub-matrices in image blocks where the second threshold value matrix is specified as the threshold value matrix, and the threshold value matrices being set in sub-matrix units in such a manner that the adjacent positional relationships between the divided sub-matrices are preserved. In this way, quantization processing is performed by using threshold value matrices which are set individually for each image block. By reducing the basic unit size of the threshold value matrices, the necessary spatial resolution can be ensured, and a dot arrangement which can respond to sudden changes in the characteristics of the input image is achieved. Furthermore, since the adjacent positional relationships between the divided sub-matrices are taken into account when setting the larger sized second threshold value matrix by dividing the threshold value matrix into sub-matrix units, then it is possible to achieve a desirable quantized image having excellent tonal reproduction.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 3A to 3C is a plan perspective diagram showing the composition of a print head in the inkjet recording apparatus illustrated in FIG. 1;

FIG. 8 is a block diagram showing an approximate view of an image processing function in the inkjet recording apparatus;

FIG. 13 is a diagram for illustrating a threshold value matrix specification step in the flowchart illustrated in FIG. 11;

FIG. 15 is a diagram showing an image in which the threshold value matrices illustrated in FIGS. 14A to 14C are used;

FIG. 18 is a diagram for illustrating a threshold value matrix resetting step in the flowchart illustrated in FIG. 16;

DETAILED DESCRIPTION OF THE PREFERRED EMBODIMENTS

General Configuration of Inkjet Recording Apparatus

Figure 1:
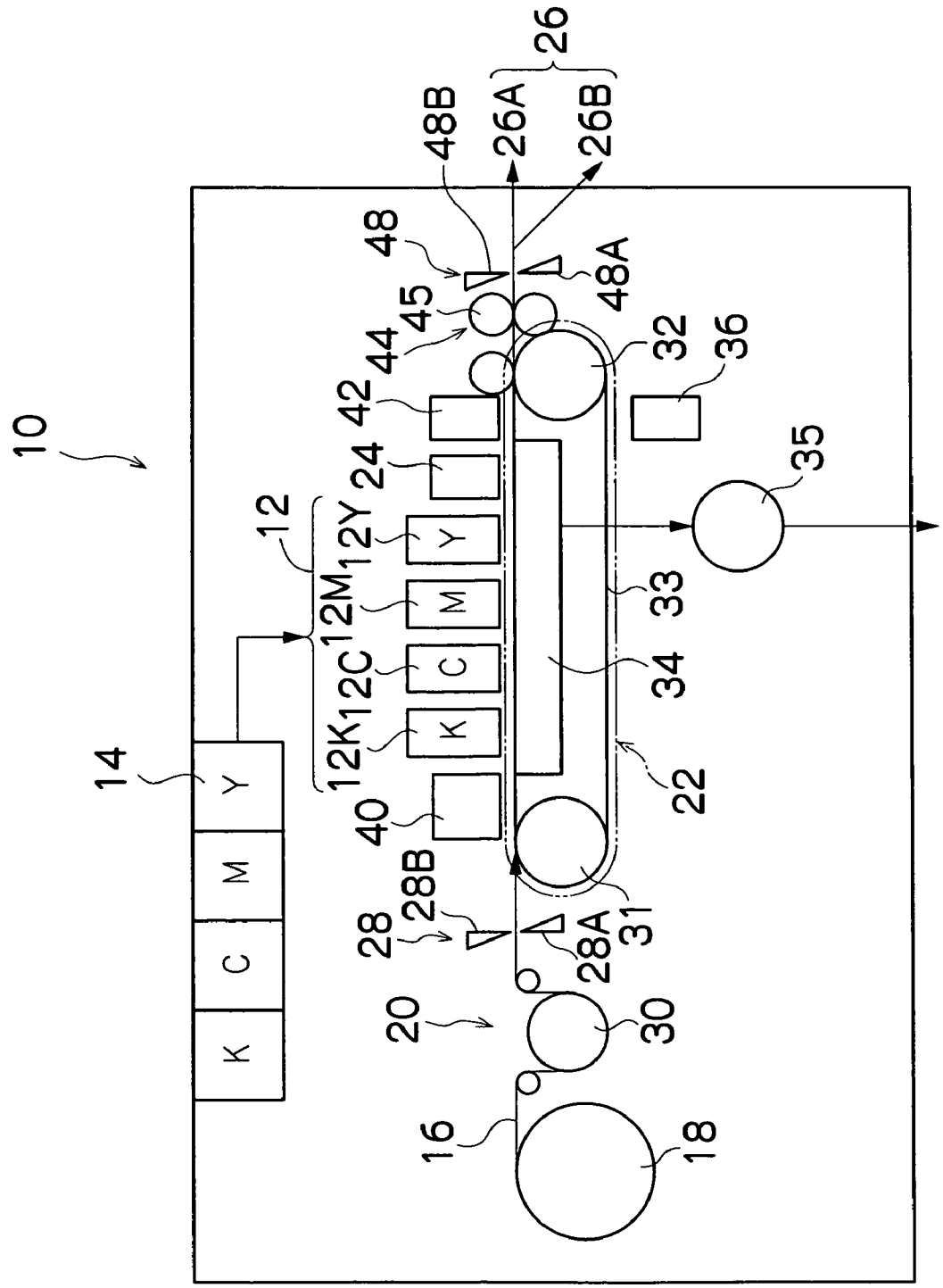
FIG. 1 is a general compositional diagram of an inkjet recording apparatus using an image processing apparatus according to an embodiment of the present invention.

FIG. 1 is a general configuration diagram of an inkjet recording apparatus using an image processing apparatus according to an embodiment of the present invention. As shown in FIG. 1, the inkjet recording apparatus 10 comprises: a printing unit 12 having a plurality of inkjet heads (hereafter, called "heads") 12K, 12C, 12M, and 12Y provided for ink colors of black (K), cyan (C), magenta (M), and yellow (Y), respectively; an ink storing and loading unit 14 for storing inks of K, C, M and Y to be supplied to the print heads 12K, 12C, 12M, and 12Y; a paper supply unit 18 for supplying recording paper 16 which is a recording medium; a decurling unit 20 removing curl in the recording paper 16; a suction belt conveyance unit 22 disposed facing the nozzle face (ink-droplet ejection face) of the printing unit 12, for conveying the recording paper 16 while keeping the recording paper 16 flat; a print determination unit 24 for reading the printed result produced by the printing unit 12; and a paper output unit 26 for outputting printed recording paper (printed matter) to the exterior.

The ink storing and loading unit 14 has ink tanks for storing the inks of K, C, M and Y to be supplied to the heads 12K, 12C, 12M, and 12Y, and the tanks are connected to the heads 12K, 12C, 12M, and 12Y by means of prescribed channels. The ink storing and loading unit 14 has a warning device (for example, a display device or an alarm sound generator) for warning when the remaining amount of any ink is low, and has a mechanism for preventing loading errors among the colors.

In FIG. 1, a magazine for rolled paper (continuous paper) is shown as an example of the paper supply unit 18; however, more magazines with paper differences such as paper width and quality may be jointly provided. Moreover, papers may be supplied with cassettes that contain cut papers loaded in layers and that are used jointly or in lieu of magazines for rolled papers.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of recording medium to be used (type of medium) is automatically determined, and ink-droplet ejection is controlled so that the ink-droplets are ejected in an appropriate manner in accordance with the type of medium.

The recording paper 16 delivered from the paper supply unit 18 retains curl due to having been loaded in the magazine. In order to remove the curl, heat is applied to the recording paper 16 in the decurling unit 20 by heating drum 30 in the direction opposite from the curl direction in the magazine. The heating temperature at this time is preferably controlled so that the recording paper 16 has a curl in which the surface on which the print is to be made is slightly round outward.

In the case of the configuration in which roll paper is used, cutters (first cutters) 28 are provided as shown in FIG. 1, and the continuous papers are cut into a desired size by the cutters 28. Each of the cutters 28 has a stationary blade 28A, of which length is not less than the width of the conveyor pathway of the recording paper 16, and a round blade 28B, which moves along the stationary blade 28A. The stationary blade 28A is disposed on the reverse side of the printed surface of the recording papers, and the round blade 28B is disposed on the printed surface side across the conveyor pathway. When cut papers are used, the cutters 28 are not required.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1. The suction chamber 34 provides suction with a fan 35 to generate a negative pressure, and the recording paper 16 is held on the belt 33 by suction.

The belt 33 is driven in the clockwise direction in FIG. 1 by the motive force of a motor (indicated by reference numeral 88 in FIG. 7) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with a cleaning roller such as a brush roller and a water absorbent roller, an air blow configuration in which clean air is blown onto the belt 33, or a combination of these. In the case of the configuration in which the belt 33 is nipped with the cleaning roller, it is preferable to make the line velocity of the cleaning roller different than that of the belt 33 to improve the cleaning effect.

The inkjet recording apparatus can comprise a roller nip conveyance mechanism, in which the recording paper is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
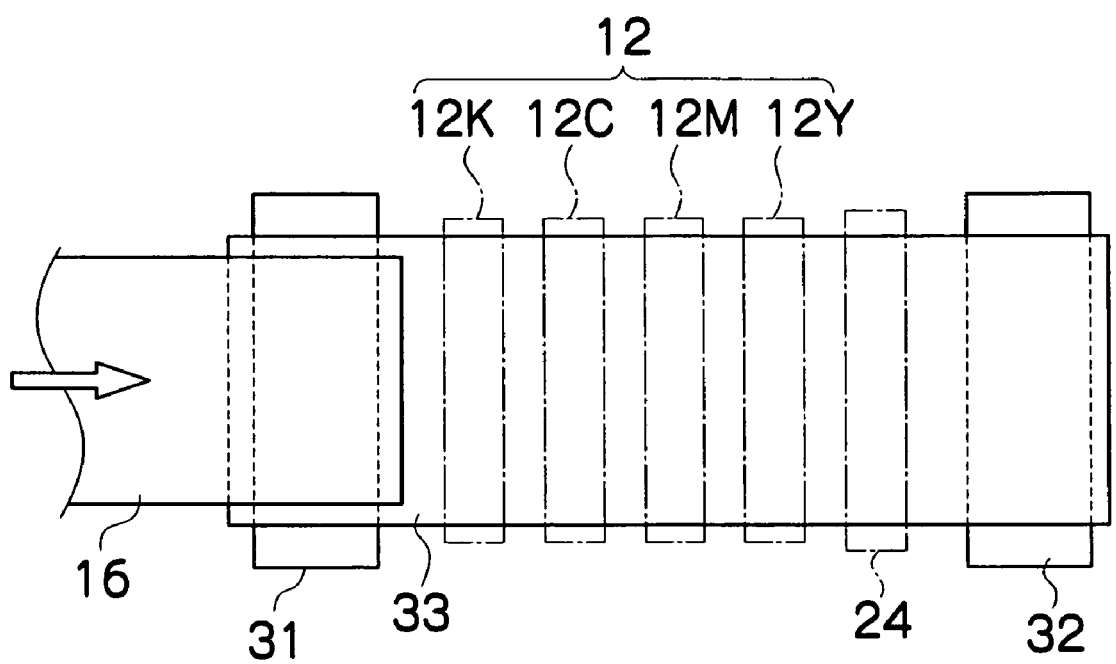
FIG. 2 is a plan view of the principal part of the peripheral area of a print unit in the inkjet recording apparatus illustrated in FIG. 1.

The heads 12K, 12C, 12M and 12Y of the printing unit 12 are full line heads having a length corresponding to the maximum width of the recording paper 16 used with the inkjet recording apparatus 10, and comprising a plurality of nozzles for ejecting ink arranged on a nozzle face through a length exceeding at least one edge of the maximum-size recording medium (namely, the full width of the printable range) (see FIG. 2).

The print heads 12K, 12C, 12M and 12Y are arranged in color order (black (K), cyan (C), magenta (M), yellow (Y)) from the upstream side in the feed direction of the recording paper 16, and these respective heads 12K, 12C, 12M and 12Y are fixed extending in a direction substantially perpendicular to the conveyance direction of the recording paper 16.

A color image can be formed on the recording paper 16 by ejecting inks of different colors from the heads 12K, 12C, 12M and 12Y, respectively, onto the recording paper 16 while the recording paper 16 is conveyed by the suction belt conveyance unit 22.

By adopting a configuration in which full line heads 12K, 12C, 12M and 12Y having nozzle rows covering the full paper width are provided for each separate color in this way, it is possible to record an image on the full surface of the recording paper 16 by performing just one operation of relatively moving the recording paper 16 and the printing unit 12 in the paper conveyance direction (the sub-scanning direction), (in other words, by means of one sub-scanning action). Higher-speed printing is thereby made possible and productivity can be improved in comparison with a shuttle type head configuration in which a recording head reciprocates in the main scanning direction.

Although the configuration with the KCMY four standard colors is described in the present embodiment, combinations of the ink colors and the number of colors are not limited to those. Light and./or dark inks can be added as required. For example, a configuration is possible in which inkjet heads for ejecting light-colored inks such as light cyan and light magenta are added. Furthermore, there are no particular restrictions of the sequence in which the heads of respective colors are arranged.

The print determination unit 24 shown in FIG. 1 has an image sensor for capturing an image of the ink-droplet deposition result of the printing unit 12, and functions as a device to check for ejection defects such as clogs of the nozzles in the printing unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the heads 12K, 12C, 12M, and 12Y. This line sensor has a color separation line CCD sensor including a red (R) sensor row comprising photoelectric transducing elements (pixels) arranged in a line provided with an R filter, a green (G) sensor row with a G filter, and a blue (B) sensor row with a B filter. Instead of a line sensor, it is possible to use an area sensor comprising photoelectric transducing elements which are arranged two-dimensionally.

A test pattern or the target image printed by the print heads 12K, 12C, 12M, and 12Y of the respective colors is read in by the print determination unit 24, and the ejection performed by each head is determined. The ejection determination includes the presence of the ejection, measurement of the dot size, and measurement of the dot deposition position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathway in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in FIG. 1, the paper output unit 26A for the target prints is provided with a sorter for collecting prints according to print orders.

Structure of the Head

Next, the structure of a head will be described. The heads 12K, 12C, 12M and 12Y of the respective ink colors have the same structure, and a reference numeral 50 is hereinafter designated to any of the heads.

Figure 3A:
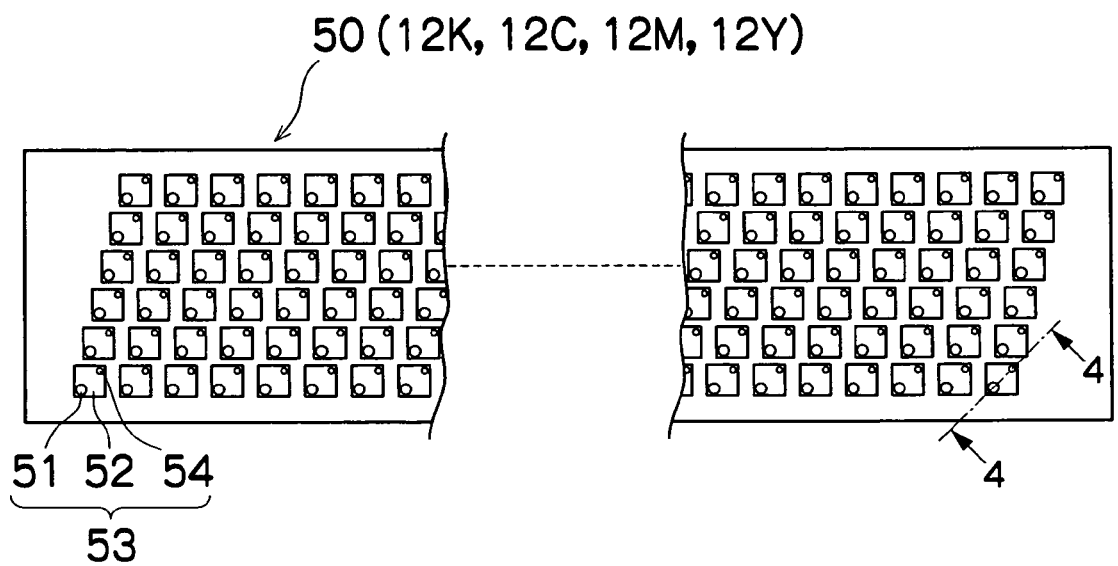
Figure 3B:
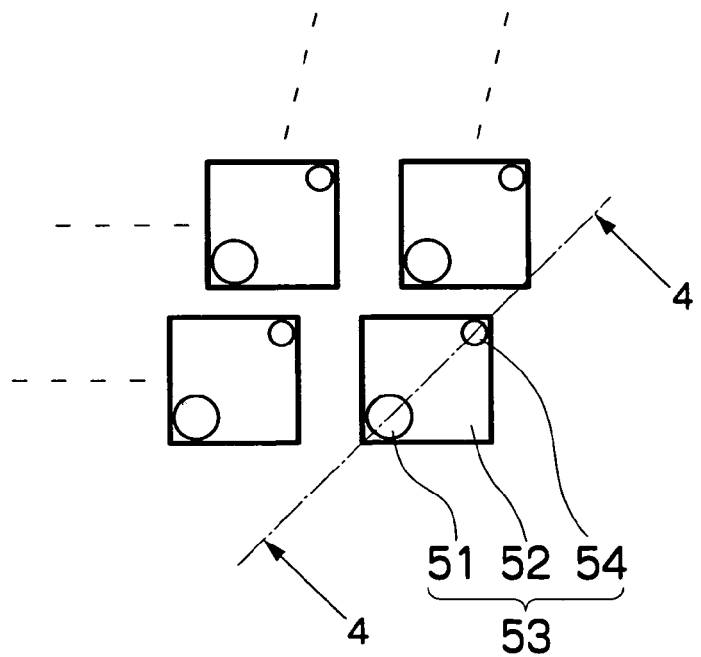
Figure 4:
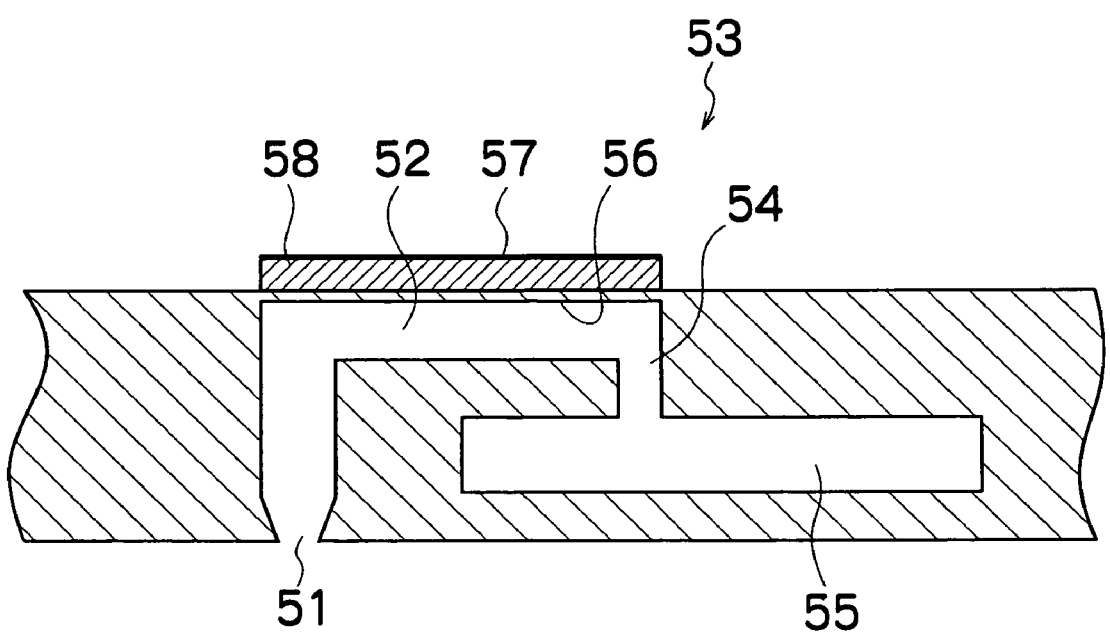
FIG. 4 is a cross-sectional view along line 4-4 in FIGS. 3A and 3B.

FIG. 3A is a perspective plan view showing an example of the configuration of the head 50, FIG. 3B is an enlarged view of a portion thereof, FIG. 3C is a perspective plan view showing another example of the configuration of the head 50, and FIG. 4 is a cross-sectional view taken along the line 4-4 in FIGS. 3A and 3B, showing the inner structure of a droplet ejection element (an ink chamber unit for one nozzle 51).

The nozzle pitch in the head 50 should be minimized in order to maximize the density of the dots printed on the surface of the recording paper 16. As shown in FIGS. 3A and 3B, the head 50 according to the present embodiment has a structure in which a plurality of ink chamber units (liquid droplet ejection elements) 53, each comprising a nozzle 51 forming an ink droplet ejection port, a pressure chamber 52 corresponding to the nozzle 51, and the like, are disposed two-dimensionally in the form of a staggered matrix, and hence the effective nozzle interval (the projected nozzle pitch) as projected in the lengthwise direction of the head (the direction perpendicular to the paper conveyance direction) is reduced (high nozzle density is achieved).

The mode of forming one or more nozzle rows through a length corresponding to the entire width of the recording paper 16 in a direction substantially orthogonal to the conveyance direction of the recording paper 16 is not limited to the example described here. For example, instead of the configuration in FIG. 3A, as shown in FIG. 3C, a line head having nozzle rows of a length corresponding to the entire width of the recording paper 16 can be formed by arranging and combining, in a staggered matrix, short head blocks 50' having a plurality of nozzles 51 arrayed in a two-dimensional fashion.

As shown in FIGS. 3A and 3B, the planar shape of the pressure chamber 52 provided for each nozzle 51 is substantially a square, and an outlet to the nozzle 51 and an inlet of supplied ink (supply port) 54 are disposed in both corners on a diagonal line of the square.

As shown in FIG. 4, each pressure chamber 52 is connected to a common channel 55 through the supply port 54. The common channel 55 is connected to an ink tank 60 (not shown in FIG. 4, but shown in FIG. 6), which is a base tank that supplies ink, and the ink supplied from the ink tank 60 is delivered through the common flow channel 55 in FIG. 4 to the pressure chambers 52.

An actuator 58 provided with an individual electrode 57 is bonded to a pressure plate 56 (a diaphragm that also serves as a common electrode) which forms the ceiling of the pressure chamber 52. When a drive voltage is applied to the individual electrode 57, the actuator 58 is deformed, the volume of the pressure chamber 52 is thereby changed, and the pressure in the pressure chamber 52 is thereby changed, so that the ink inside the pressure chamber 52 is thus ejected through the nozzle 51. The actuator 58 is preferably a piezoelectric element. When ink is ejected, new ink is supplied to the pressure chamber 52 from the common flow channel 55 through the supply port 54.

Figure 5:
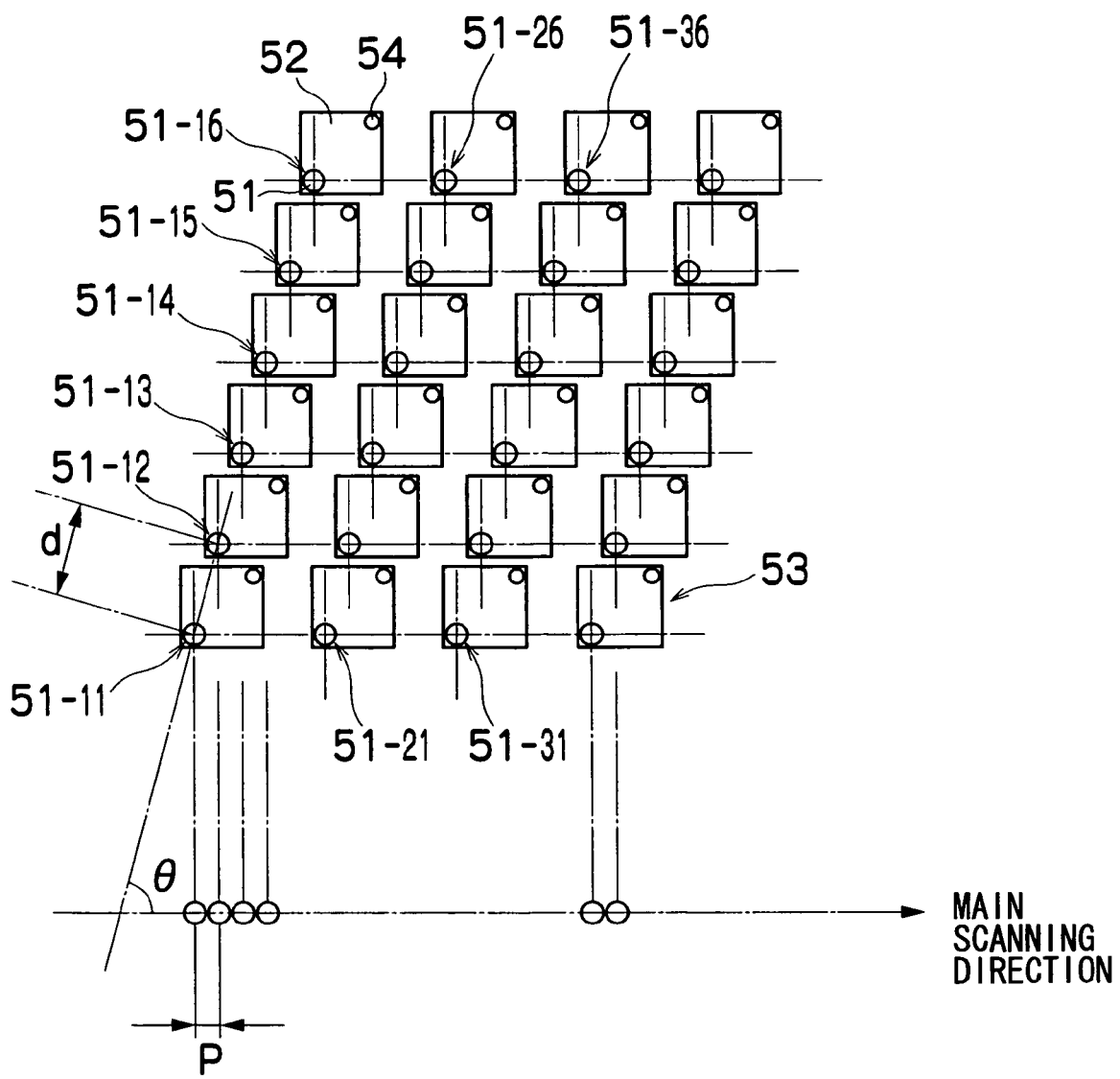
FIG. 5 is an enlarged view showing a nozzle arrangement in the print head illustrated in FIG. 3A.

As shown in FIG. 5, the high-density nozzle head according to the present embodiment is achieved by arranging a plurality of ink chamber units 53 having this structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 53 are arranged at a uniform pitch d in line with a direction forming an angle of θ with respect to the main scanning direction, the pitch P of the nozzles projected so as to align in the main scanning direction is d×cos θ, and hence the nozzles 51 can be regarded to be equivalent to those arranged linearly at a fixed pitch P along the main scanning direction. Such configuration results in a nozzle structure in which the nozzle row projected in the main scanning direction has a high nozzle density of up to 2,400 per inch (2400 nozzles per inch).

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other.

In particular, when the nozzles 51 arranged in a matrix such as that shown in FIG. 5 are driven, the main scanning according to the above-described (3) is preferred. More specifically, the nozzles 51-11, 51-12, 51-13, 51-14, 51-15 and 51-16 are treated as a block (additionally; the nozzles 51-21, 51-22, . . . , 51-26 are treated as another block; the nozzles 51-31, 51-32, . . . , 51-36 are treated as another block, . . . ); and one line is printed in the width direction of the recording papers 16 by sequentially driving the nozzles 51-11, 51-12, . . . , 51-16 in accordance with the conveyance velocity of the recording papers 16.

On the other hand, "sub-scanning" is defined as to repeatedly perform printing of one line (a line formed of a row of dots, or a line formed of a plurality of rows of dots) formed by the main scanning, while moving the full-line head and the recording paper relatively to each other.

In implementing the present invention, the arrangement of the nozzles is not limited to that of the example illustrated. Moreover, a method is employed in the present embodiment where an ink droplet is ejected by means of the deformation of the actuator 58, which is typically a piezoelectric element; however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure of these bubbles.

Configuration of Ink Supply System

Figure 6:
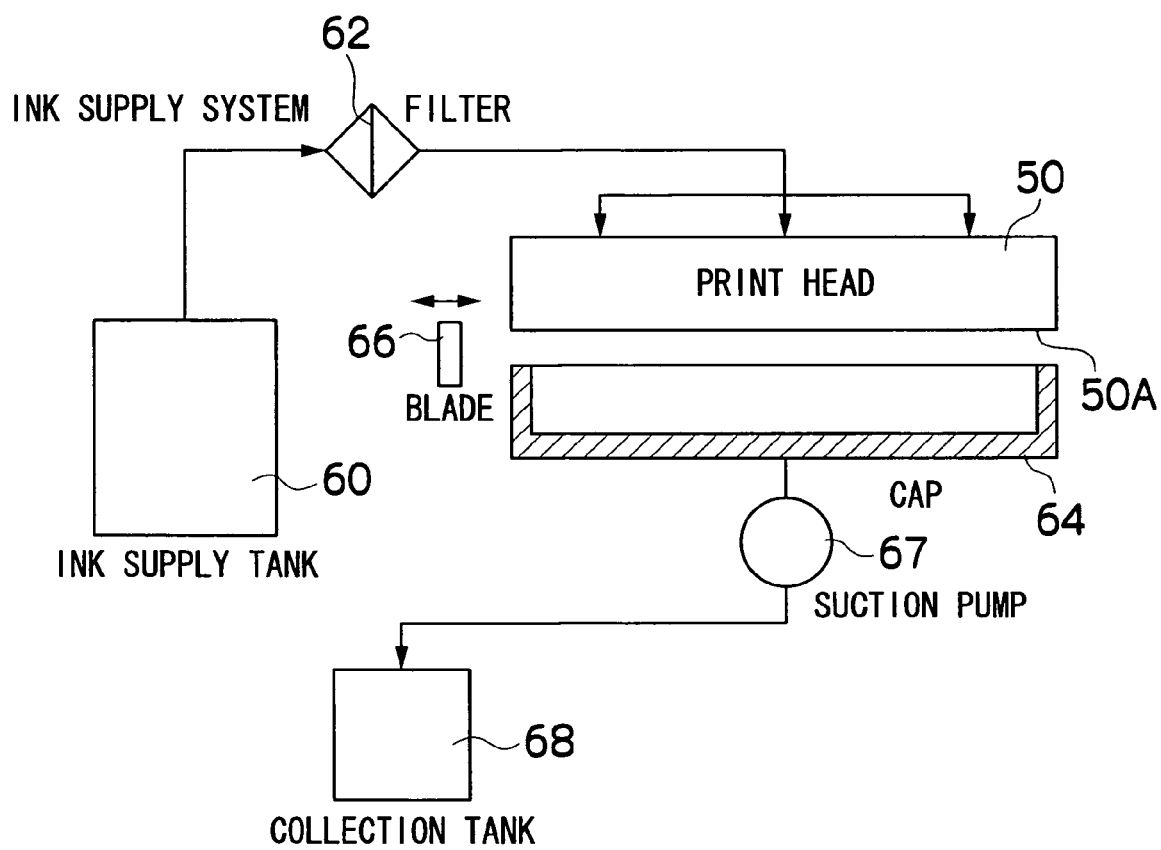
FIG. 6 is a schematic drawing showing the composition of an ink supply system in the inkjet recording apparatus.

FIG. 6 is a schematic drawing showing the configuration of the ink supply system in the inkjet recording apparatus 10. The ink tank 60 is a base tank that supplies ink to the head 50 and is set in the ink storing and loading unit 14 described with reference to FIG. 1. The aspects of the ink tank 60 include a refillable type and a cartridge type: when the remaining amount of ink is low, the ink tank 60 of the refillable type is filled with ink through a filling port (not shown) and the ink tank 60 of the cartridge type is replaced with a new one. In order to change the ink type in accordance with the intended application, the cartridge type is suitable, and it is preferable to represent the ink type information with a bar code or the like on the cartridge, and to perform ejection control in accordance with the ink type. The ink tank 60 in FIG. 6 is equivalent to the ink storing and loading unit 14 in FIG. 1 described above.

A filter 62 for removing foreign matters and bubbles is disposed between the ink tank 60 and the head 50 as shown in FIG. 6. The filter mesh size in the filter 62 is preferably equivalent to or less than the diameter of the nozzle and commonly about 20 μm. Although not shown in FIG. 6, it is preferable to provide a sub-tank integrally to the print head 50 or nearby the head 50. The sub-tank has a damper function for preventing variation in the internal pressure of the head and a function for improving refilling of the print head.

The inkjet recording apparatus 10 is also provided with a cap 64 as a device to prevent the nozzles 51 from drying out or to prevent an increase in the ink viscosity in the vicinity of the nozzles 51, and a cleaning blade 66 as a device to clean the nozzle face 50A. A maintenance unit including the cap 64 and the cleaning blade 66 can be relatively moved with respect to the head 50 by a movement mechanism (not shown), and is moved from a predetermined holding position to a maintenance position below the head 50 as required.

The cap 64 is displaced up and down relatively with respect to the head 50 by an elevator mechanism (not shown). When the power of the inkjet recording apparatus 10 is switched OFF or when in a print standby state, the cap 64 is raised to a predetermined elevated position so as to come into close contact with the head 50, and the nozzle face 50A is thereby covered with the cap 64.

The cleaning blade 66 comprises rubber or another elastic member, and can slide on the ink ejection surface (surface of the nozzle plate) of the head 50 by means of a blade movement mechanism (not shown). When ink droplets or foreign matter has adhered to the nozzle plate, the surface of the nozzle plate is wiped, and the surface of the nozzle plate is cleaned by sliding the cleaning blade 66 on the nozzle plate.

During printing or standby, when the frequency of use of specific nozzles is reduced and ink viscosity increases in the vicinity of the nozzles, a preliminary discharge is made toward the cap 64 to eject the degraded ink.

Also, when bubbles have become intermixed in the ink inside the head 50 (inside the pressure chamber 52), the cap 64 is placed on the head 50, ink (ink in which bubbles have become intermixed) inside the pressure chamber 52 is removed by suction with a suction pump 67, and the suction-removed ink is sent to a collection tank 68. This suction action entails the suctioning of degraded ink of which viscosity has increased (hardened) when initially loaded into the head 50, or when service has started after a long period of being stopped.

When a state in which ink is not ejected from the head 50 continues for a certain amount of time or longer, the ink solvent in the vicinity of the nozzles 51 evaporates and ink viscosity increases. In such a state, ink can no longer be ejected from the nozzle 51 even if the actuator 58 for the ejection driving is operated. Before reaching such a state the actuator 58 is operated (in a viscosity range that allows ejection by the operation of the actuator 58), and the preliminary discharge is made toward the ink receptor to which the ink of which viscosity has increased in the vicinity of the nozzle is to be ejected. After the nozzle surface is cleaned by a wiper such as the cleaning blade 66 provided as the cleaning device for the nozzle face 50A, a preliminary discharge is also carried out in order to prevent the foreign matter from becoming mixed inside the nozzles 51 by the wiper sliding operation. The preliminary discharge is also referred to as "dummy discharge", "purge", "liquid discharge", and so on.

When bubbles have become intermixed in the nozzle 51 or the pressure chamber 52, or when the ink viscosity inside the nozzle 51 has increased over a certain level, ink can no longer be ejected by the preliminary discharge, and a suctioning action is carried out as follows.

More specifically, when bubbles have become intermixed in the ink inside the nozzle 51 and the pressure chamber 52, ink can no longer be ejected from the nozzle 51 even if the actuator 58 is operated. Also, when the ink viscosity inside the nozzle 51 has increased over a certain level, ink can no longer be ejected from the nozzle 51 even if the actuator 58 is operated. In these cases, a suctioning device to remove the ink inside the pressure chamber 52 by suction with a suction pump, or the like, is placed on the nozzle face 50A of the head 50, and the ink in which bubbles have become intermixed or the ink of which viscosity has increased is removed by suction.

However, since this suction action is performed with respect to all the ink in the pressure chamber 52, the amount of ink consumption is considerable. Therefore, a preferred aspect is one in which a preliminary discharge is performed when the increase in the viscosity of the ink is small.

Description of Control System

Figure 7:
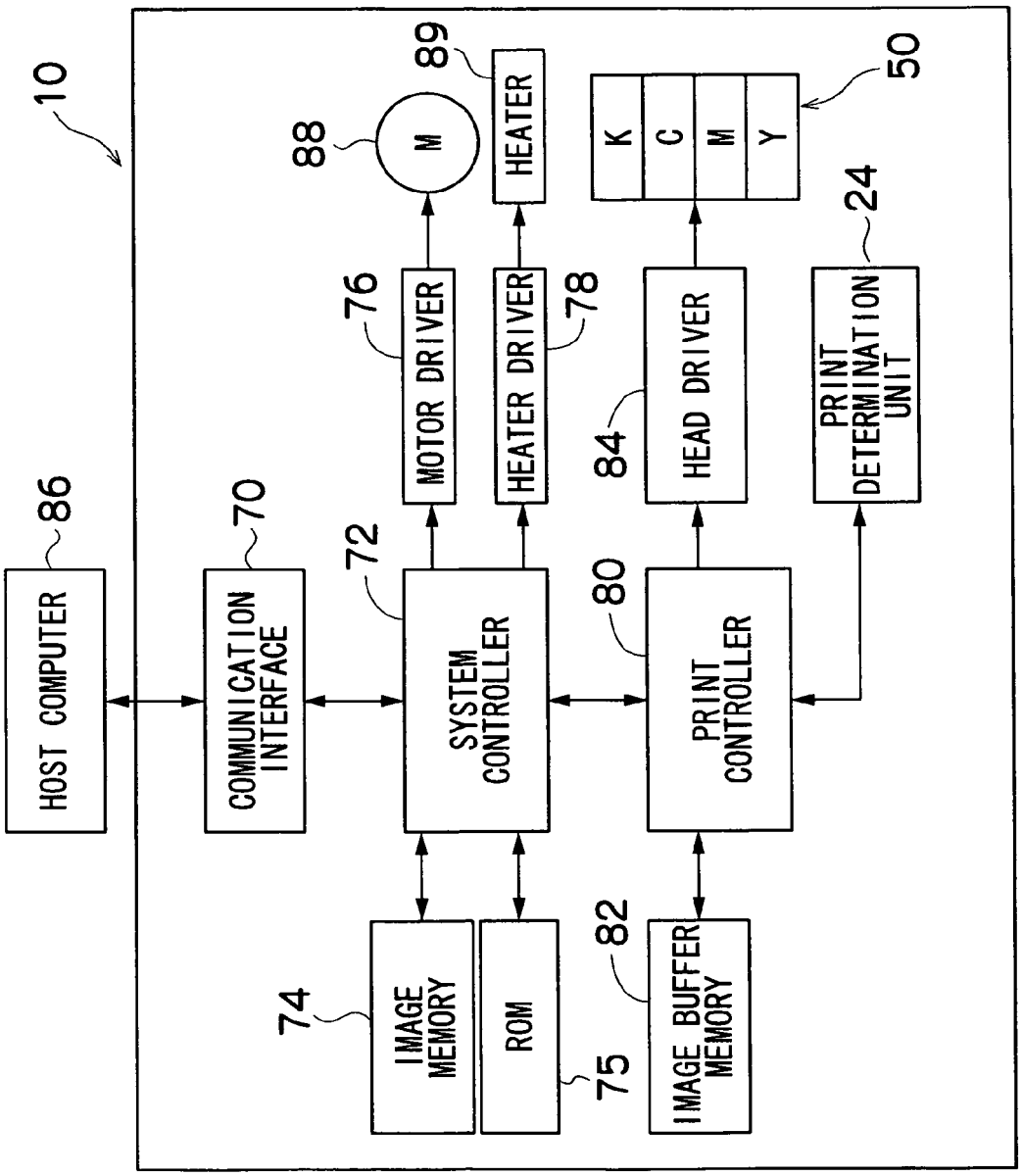
FIG. 7 is a principal block diagram showing the system composition of the inkjet recording apparatus.

FIG. 7 is a principal block diagram showing the system configuration of the inkjet recording apparatus 10. The inkjet recording apparatus 10 comprises a communication interface 70, a system controller 72, an image memory 74, a ROM 75, a motor driver 76, a heater driver 78, a print controller 80, an image buffer memory 82, a head driver 84, and the like.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74.

The image memory 74 is a storage device for temporarily storing images inputted through the communication interface 70, and data is written and read to and from the image memory 74 through the system controller 72. The image memory 74 is not limited to memory comprising a semiconductor element, and a hard disk drive or another magnetic medium may be used.

The system controller 72 is constituted by a central processing unit (CPU) and peripheral circuits thereof, and the like, and it functions as a control device for controlling the whole of the inkjet recording apparatus 10 in accordance with a prescribed program, as well as a calculation device for performing various calculations. More specifically, the system controller 72 controls the various sections, such as the communication interface 70, image memory 74, motor driver 76, heater driver 78, and the like, and as well as controlling communications with the host computer 86 and writing and reading to and from the image memory 74, it also generates control signals for controlling the motor 88 and heater 89 of the conveyance system.

The program executed by the CPU of the system controller 72 and the various types of data which are required for control procedures are stored in the ROM 75. The ROM 75 may be a non-rewriteable storage device, or it may be a rewriteable storage device, such as an EEPROM. The image memory 74 is used as a temporary storage region for the image data, and it is also used as a program development region and a calculation work region for the CPU.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals from the image data stored in the image memory 74 in accordance with commands from the system controller 72 so as to supply the generated print data (dot data) to the head driver 84. Prescribed signal processing is carried out in the print controller 80, and the ejection amount and the ejection timing of the ink droplets from the respective print heads 50 are controlled via the head driver 84, according to the print data. By this means, prescribed dot size and dot positions can be achieved.

The print controller 80 is provided with the image buffer memory 82; and image data, parameters, and other data are temporarily stored in the image buffer memory 82 when image data is processed in the print controller 80. The aspect shown in FIG. 7 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives the actuators 58 of the heads of the respective colors, 12K, 12C, 12M, 12Y, according to print data supplied by the print controller 80. A feedback control system for maintaining constant drive conditions for the print heads may be included in the head driver 84.

The image data to be printed is externally inputted through the communication interface 70, and is stored in the image memory 74. In this stage, the RGB image data is stored in the image memory 74.

The image data stored in the image memory 74 is sent to the print controller 80 through the system controller 72, and is converted to the dot data for each ink color in the print controller 80. In other words, the print controller 80 performs processing for converting the input RGB image data into dot data for four colors, K, C, M and Y. The dot data generated by the print controller 80 is stored in the image buffer memory 82.

The head driver 84 generates drive control signals for the head 50 according to the dot data stored in the image buffer memory 82. By supplying the drive control signals generated by the head driver 84 to the head 50, ink is ejected from the head 50. By controlling ink ejection from the heads 50 in synchronization with the conveyance speed of the recording paper 16, an image is formed on the recording paper 16.

The print determination unit 24 is a block that includes the line sensor as described above with reference to FIG. 1, reads the image printed on the recording paper 16, determines the print conditions (presence of the ejection, variation in the dot deposition, and the like) by performing desired signal processing, or the like, and provides the determination results of the print conditions to the print controller 80.

According to requirements, the print controller 80 makes various corrections with respect to the head 50 according to information obtained from the print determination unit 24.

Description of Image Processing

Next, a method for processing an image signal in an inkjet recording apparatus 10 having the composition described above will be explained.

FIG. 8 is a block diagram showing an approximate view of an image processing function in the inkjet recording apparatus 10 according to the present example. As shown in the diagram, this inkjet recording apparatus 10 comprises a color conversion unit 102 and a binarization processing unit 104 which generate ink data or dot density data (KCMY data) from input image data (RGB data) 100, and a head drive signal generation unit 106 which creates a drive signal for the head 50 according to the dot data obtained by the binarization process (quantization process), in such a manner that droplets 108 forming desired dots are ejected.

As described with respect to FIG. 7, the image data (RGB data) 100 to be printed is input to the inkjet recording apparatus 10 via a prescribed image input unit, such as the communications interface 70, and is then supplied to the color conversion unit 102 shown in FIG. 8. The color conversion unit 102 carries out processing for converting the RGB data of each pixel in the image into ink data or dot density data corresponding to the RGB data. The ink data or dot density data generated by the color conversion unit 102 is subjected to prescribed processing, such as tonal correction, and is then supplied to the binarization processing unit 104.

The binarization processing unit 104 binarizes (quantizes) the graduated tone image comprising the colors KCMY (namely, the multiple-value image signal), and converts it into a dot pattern (quantized signal) for a pseudo graduated tone image. As described in detail hereafter, the input image is divided into a plurality of blocks, as shown in FIG. 8, and in the image frequency analyzing unit 120, the spatial frequency of the image or a characteristic quantity corresponding to same (for example, a spectral analysis based on a Fourier transform, or the output from a bandpass filter) is sampled for each block. According to the spatial frequency of the block under examination (the image block which is being processed), the threshold value matrix specification unit 122 assigns the threshold value matrix corresponding to low frequency if the block under examination comprises principally low-frequency pixels. Furthermore, if the block under examination comprises high-frequency pixels, then it assigns the threshold value matrix corresponding to high frequency.

In this way, the optimum threshold value matrix is selected for each block under examination, from the plurality of threshold value matrices (described in more detail hereafter).

Furthermore, the threshold value matrix specification unit 122 sets the specified threshold value matrix as the threshold value matrix for the block under examination, and the threshold value matrix processing unit 126 generates a quantized signal from the multiple-value signal by means of an algorithm which implements threshold value matrix processing using the specified threshold value matrix. The recording medium specification unit 124 may be constituted by using a threshold value matrix control table, which is an index for determining which threshold value matrix applies to which image block, in such a manner that the threshold value matrix control table can be changed according to the spatial frequency of each block.

In this inkjet recording apparatus 10, an image which appears to have a continuous tonal gradation to the human eye is formed by changing the droplet ejection density and the dot size of fine dots created by ink (coloring material), and therefore, it is necessary to convert the input digital image into a dot pattern which reproduces the tonal gradations of the image (namely, the light and shade toning of the image) as faithfully as possible. The binarization processing unit 104 generates a dot pattern from the input image data by using a binarization algorithm as described hereafter.

First Embodiment

Figure 9A:
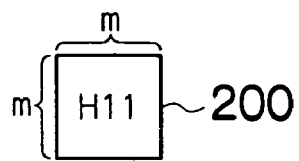
FIGS. 9A to 9C are diagrams showing threshold value matrices used in the image processing apparatus according to a first embodiment of the present invention.
Figure 9B:
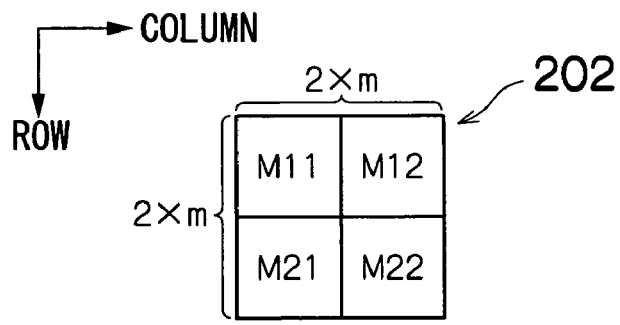
Figure 9C:
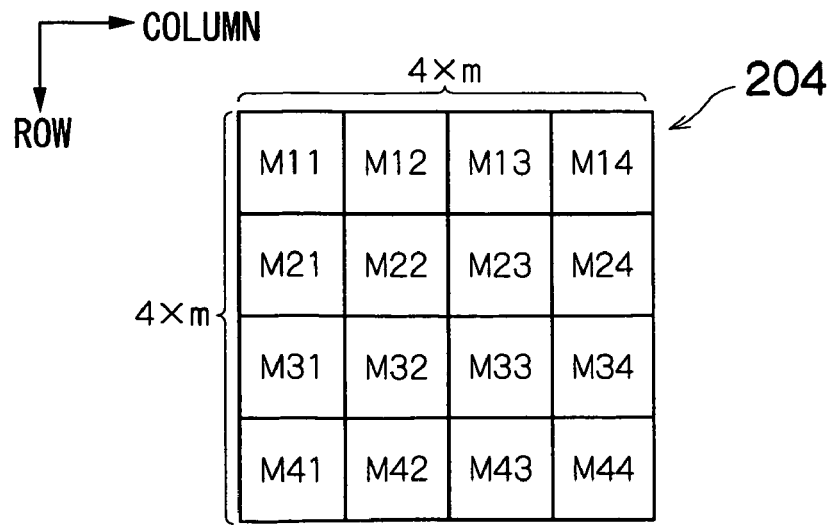

FIGS. 9A to 9C show threshold value matrices which are used in the aforementioned binarization processing. The high-frequency threshold value matrix 200 shown in FIG. 9A is a threshold value matrix having a size of m×m, which is used when the spatial frequency of the block under examination is a high frequency. Moreover, the medium-frequency threshold value matrix 202 shown in FIG. 9B is a threshold value matrix having a size of (2×m)×(2×m), which is used when the spatial frequency of the block under examination is a medium frequency. Furthermore, the low-frequency threshold value matrix 204 shown in FIG. 9C is a threshold value matrix having a size of (4×m)×(4×m), which is used when the spatial frequency of the block under examination is a low frequency.

The medium-frequency threshold value matrix 202 and the low-frequency threshold value matrix 204 shown in FIGS. 9B and 9C can be divided into sub-matrices by taking the size of the high-frequency threshold value matrix 200 as the base unit (or unit block), and the threshold value matrices can be set in terms of these sub-matrix units when establishing threshold value matrices for the respective image blocks.

More specifically, the medium-frequency threshold value matrix 202 shown in FIG. 9B can be divided into four sub-matrices M11 to M22, and the low-frequency threshold value matrix 204 can be divided into 16 sub-matrices L11 to L44.

Furthermore, the medium-frequency threshold value matrix 202 and the low-frequency threshold value matrix 204 can be set in sub-matrix units; for instance, it is possible to set only one sub-matrix M11 in the medium-frequency threshold value matrix 202, or to set two sub-matrices M11 and M12.

The sizes of the medium-frequency threshold value matrix 202 and low-frequency threshold value matrix 204 shown in FIGS. 9B and 9C are only one example, and it is also possible, for instance to set the size of the medium-frequency threshold value matrix 202 to (3×m)×(3×m), the size of the low-frequency threshold value matrix 204 to (9×m)×(9×m), and so on, provided that the sizes of the medium-frequency threshold value matrix 202 and the low-frequency threshold value matrix 204 are integral multiples of the high-frequency threshold value matrix 200.

The three threshold value matrices described above are stored in a ROM 75 as illustrated in FIG. 7, and are read out selectively in accordance with a selection signal (a signal which is switched depending on the characteristic quantity for each image block) that is sent by the system controller 72.

In the present example, three threshold value matrices for low-frequency medium-frequency and high-frequency are provided, but it is also possible to provided two threshold value matrices, for low-frequency and high-frequency, or alternatively, four or more threshold value matrices. Furthermore, in the present example, the threshold value matrices are depicted as being square-shaped matrices, but their shape is not limited to a square shape, and hexagonal or diamond-shaped matrices may also be used.

Figure 10:
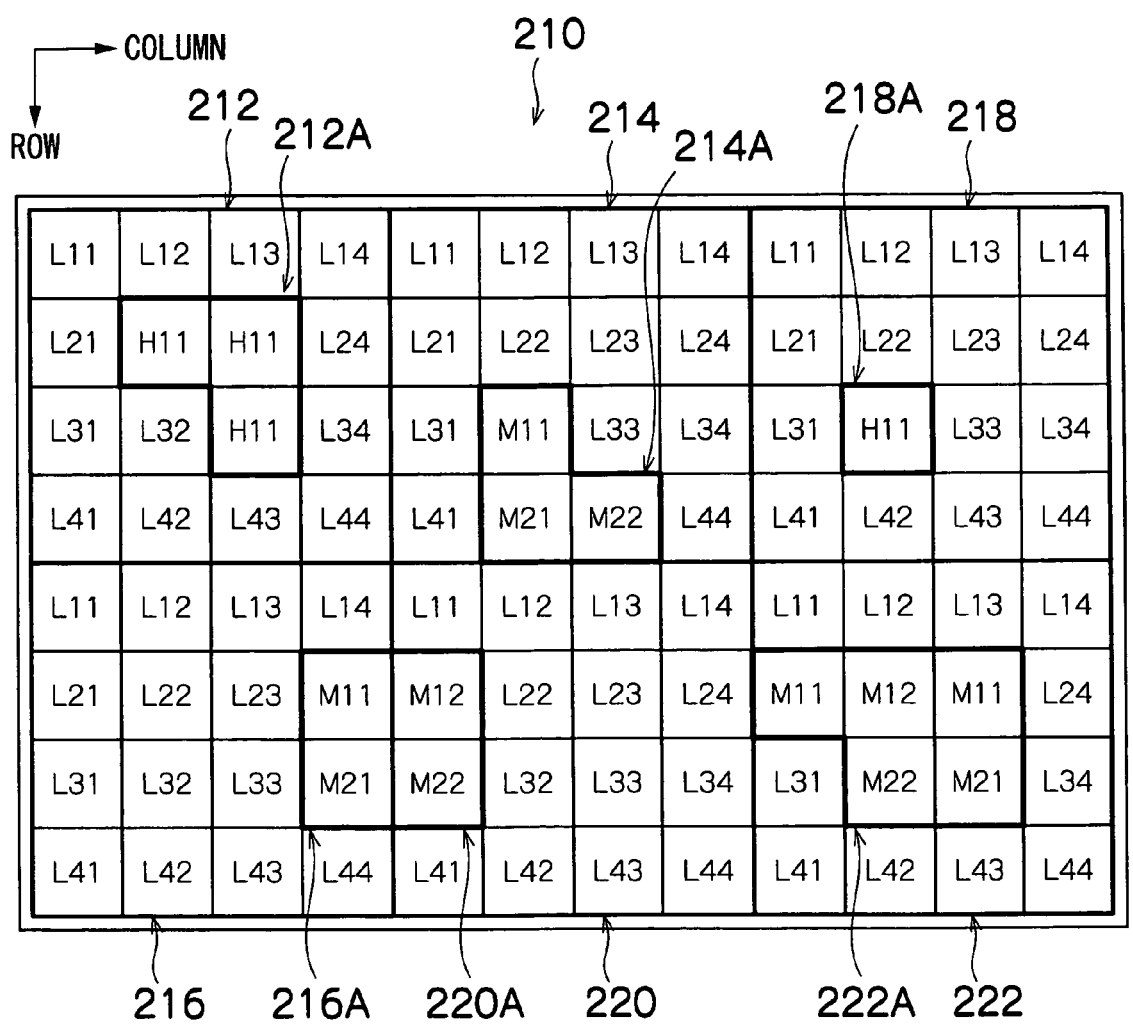
FIG. 10 is a diagram showing an image in which the threshold value matrices illustrated in FIGS. 9A to 9C are used.

FIG. 10 shows an image 210 in which the three types of threshold value matrices shown in FIGS. 9A to 9C have been set. The smallest square shape in this image 210 indicates the base unit of the threshold value matrices, and a plurality of the pixels which constitute the image 210 are located within each of these base units.

Looking at one example of the number of pixels located within a base unit (sub-matrix), if the resolution is approximately 1200 dpi, then the number of pixels is approximately 64 (=8×8) to 256 (=16×16). However, if the pixel under examination is located in the center of a block, then a larger unit (block) than this may be used in order to analyze the spatial frequency.

Figure 24:
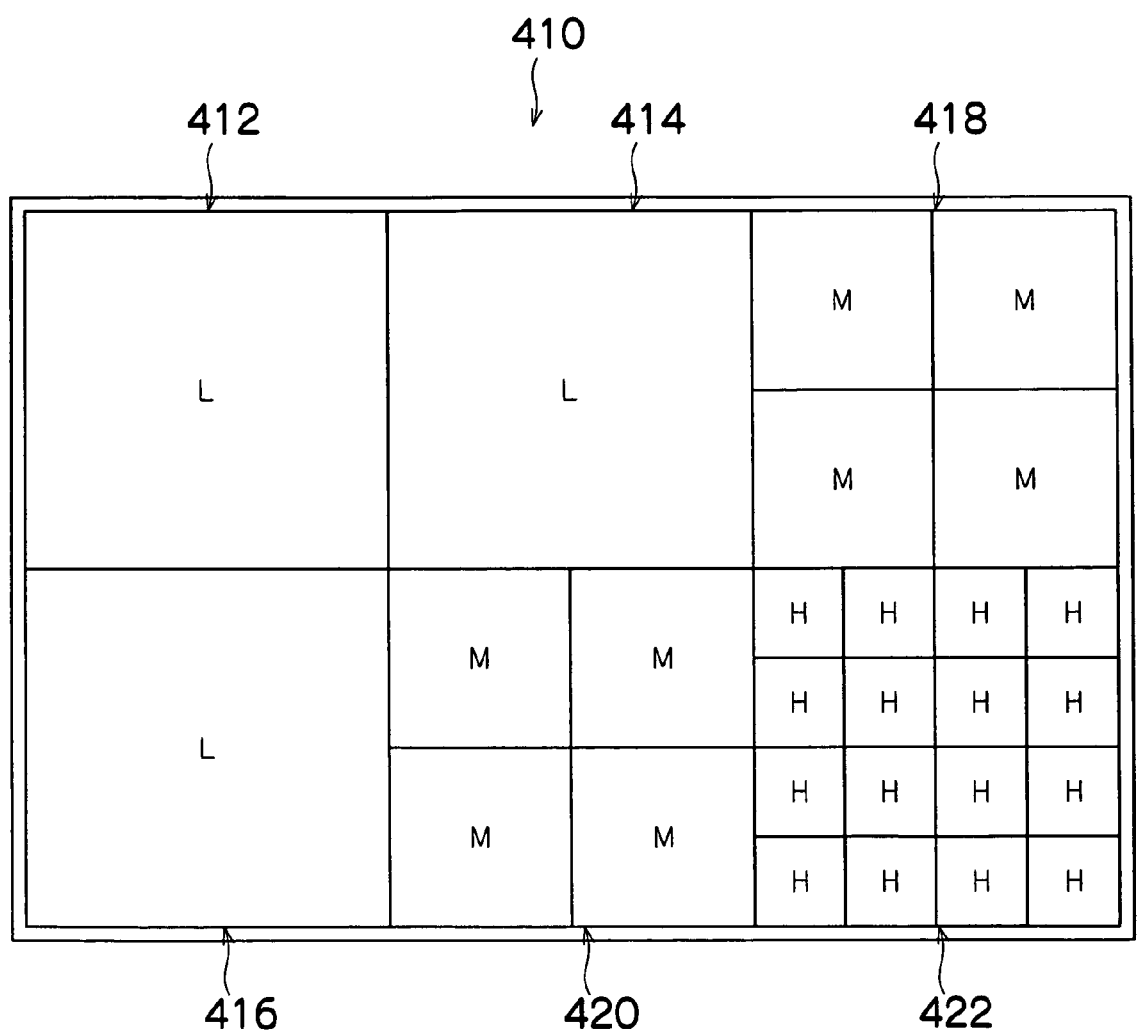
FIG. 24 is a diagram showing an image in which the threshold value matrices illustrated in FIGS. 23A to 23C are used.

In an image 410 according to the prior art (as shown in FIG. 24), the base unit of the threshold value matrix is taken as the size of the low-frequency threshold value matrix 204, and therefore the image is divided up according to this unit size.

Therefore, in the blocks 412, 414 and 416 for which the low-frequency threshold value matrix 204 is established, all of the pixels are binarized by using the low-frequency threshold value matrix 204, and in blocks 418 and 420, all of the pixels are binarized using the medium-frequency threshold value matrix 404.

On the other hand, in the image 210 shown in FIG. 10, the base unit of the threshold value matrix is taken to be the size of the high-frequency threshold value matrix 200, and therefore, the blocks 212, 214 and 216 which are equivalent to the blocks 412, 414 and 416 in image 410 in FIG. 24 are further divided into 16 blocks, and an optimum threshold value matrix is set for each of these divided blocks and used in the binarization processing.

For example, in block 212 of image 210, the blocks in row 2, columns 2 and 3, and line 3, column 3, are high-frequency blocks which are judged to have a high spatial frequency, and the other blocks are low-frequency blocks which are judged to have a low spatial frequency.

Since the size (shape) of the low-frequency region in block 212 is different to the size of the low-frequency threshold value matrix 204, the low-frequency threshold value matrix 204 is divided into 16 sub-matrices L11 to L44 using the base unit size in such a manner that row 1, column 1 is assigned with sub-matrix L11, row 1, column 2 is assigned with sub-matrix L12, and row 1, column 3 is assigned with sub-matrix L13, and the respective image blocks are established in such a manner that the adjacent positional relationships between the divided sub-matrices are preserved. Furthermore, the high-frequency threshold value matrix 200 is set for the blocks at lines 2 and 3, column 2, and line 3, column 3.

In other words, it can be seen that the block 212 is divided into 16 parts using the threshold value matrix base unit, and the sub-matrices (block 212A) of a portion of the low-frequency threshold value matrix 204 illustrated in FIG. 9C are replaced with high-frequency threshold value matrices 200 as illustrated in FIG. 9A.

Similarly, the block 214 of the image 210 corresponding to block 414 in image 410 contains a block for which the low-frequency threshold value matrix 204 is set and a block 214A (rows 3 and 4, column 6; row 4, column 7) for which the medium-frequency threshold value matrix 202 is set, and in the regions where the medium-frequency threshold value matrix 202 or the low-frequency threshold value matrix 204 are applied in a continuous fashion, the adjacent positional relationships between the respective divided sub-matrices are preserved.

Moreover, block 216 contains a block where the low-frequency threshold value matrix 204 has been set and a block 216A (rows 6 and 7, column 4) where the medium-frequency threshold value matrix 202 has been set. Furthermore, block 218 contains a block where the low-frequency threshold value matrix 204 has been set and a block 218A (row 3, column 10) where the high-frequency threshold value matrix 200 has been set.

Moreover, block 220 contains a block where the low-frequency threshold value matrix 204 has been set and a block 220A (rows 6 and 7, column 5) where the medium-frequency threshold value matrix 202 has been set. Furthermore, block 222 contains a block where the low-frequency threshold value matrix 204 has been set and a block 222A (row 6, columns 9 and 11, and row 7, columns 10 and 11) where the medium-frequency threshold value matrix 202 has been set.

Naturally, in regions 216 to 222 also, the adjacent positional relationships between the divided sub-matrices are preserved in the regions where the medium-frequency threshold value matrix 202 and the low-frequency threshold value matrix 204 apply in a continuous fashion.

Next, the image processing method according to the first embodiment is described in detail with reference to FIG. 11 to FIG. 13.

Figure 11:
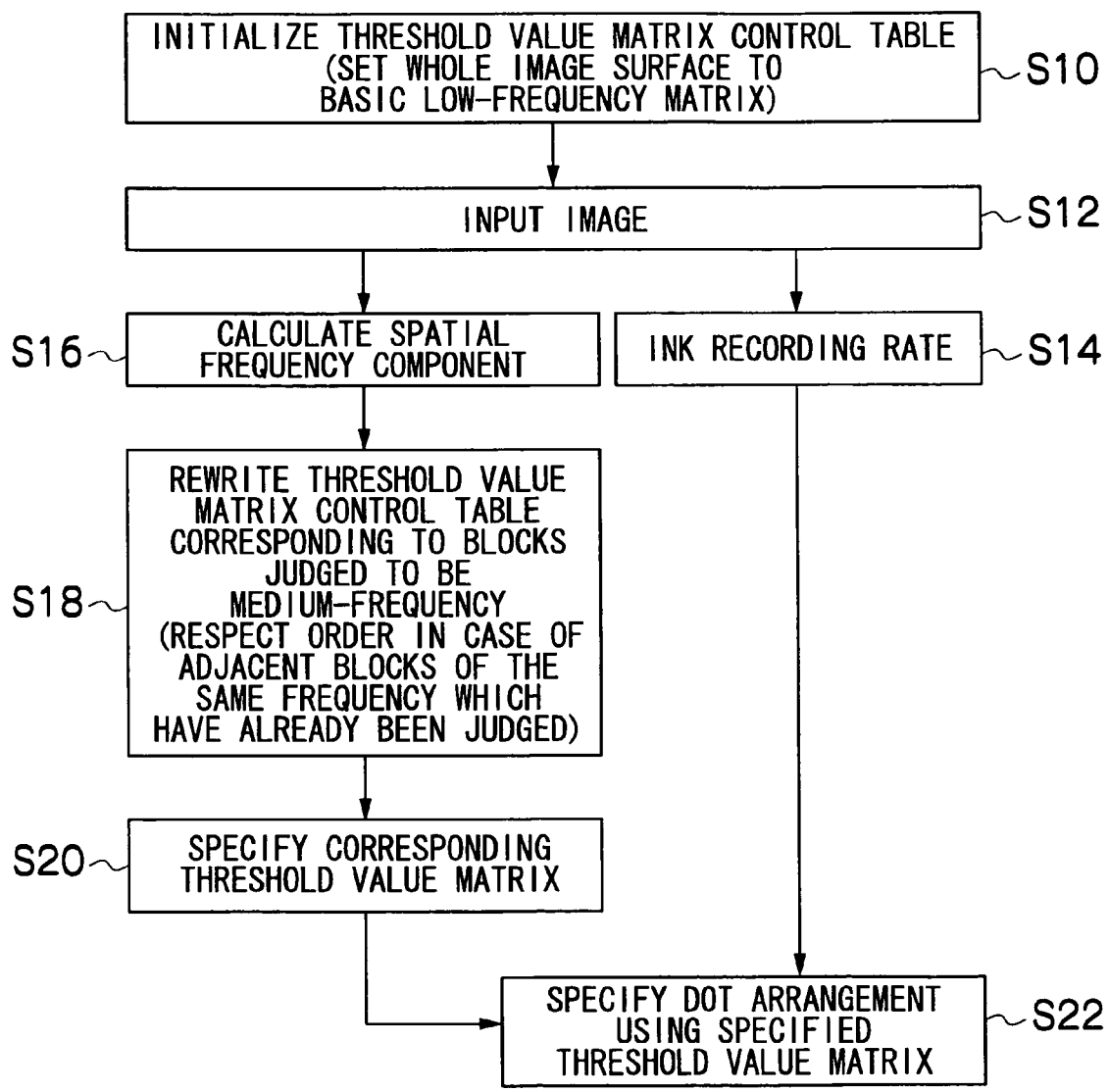
FIG. 11 is a flowchart showing a sequence of image processing according to the first embodiment of the present invention.

FIG. 11 is a flowchart showing the sequence of control of the image processing method according to the first embodiment.

Figure 12:
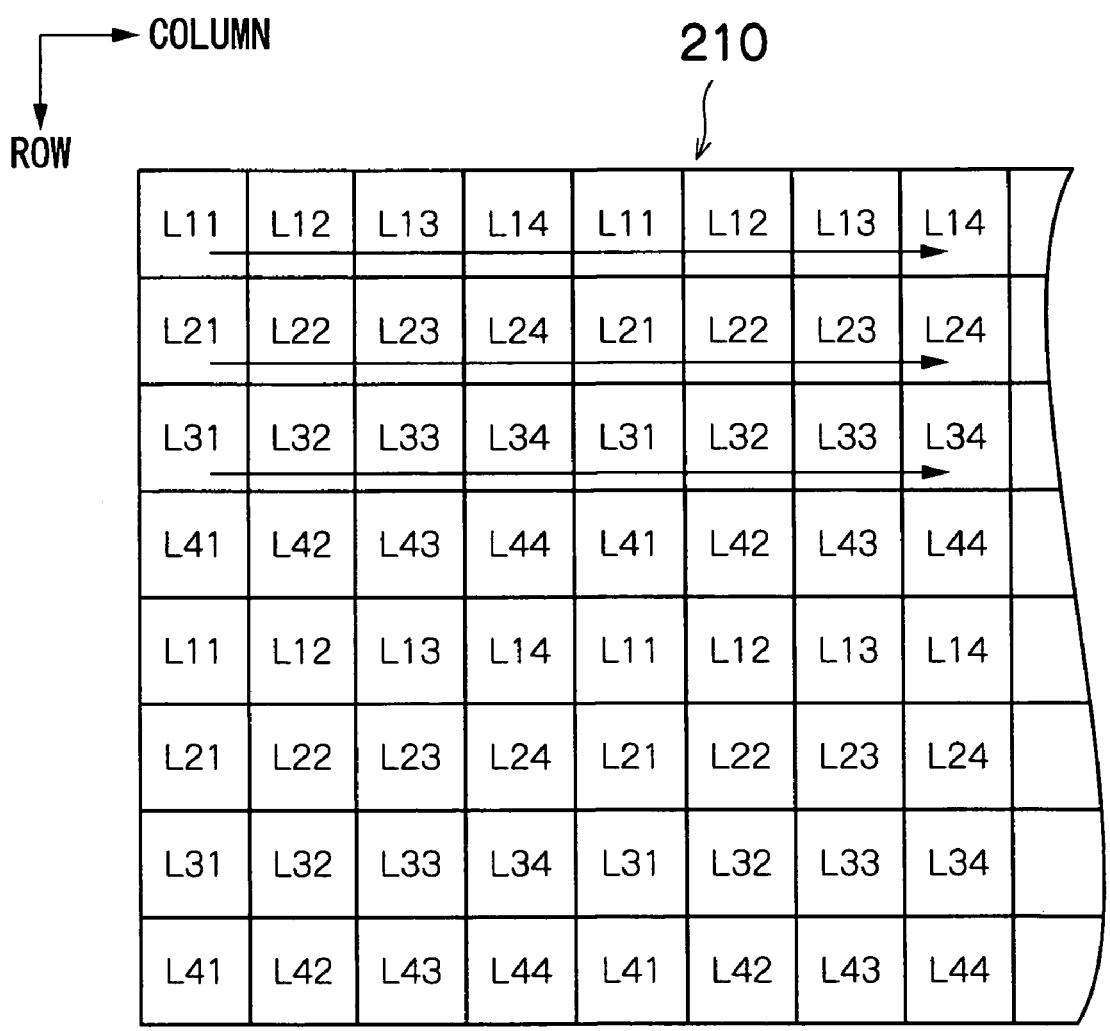
FIG. 12 is a diagram showing initialization processing in the flowchart illustrated in FIG. 11.

As shown in FIG. 11, firstly, the threshold value matrix control table is initialized, and as shown in FIG. 12, the low-frequency threshold value matrix 204 is established (step S10). The arrangement of the threshold value matrices is decided by means of the threshold value matrix control table described above, by taking account of the sequence of the threshold value matrices in such a manner that the adjacent positional relationship of the sub-matrices obtained by dividing the threshold value matrices is preserved.

Thereupon, image data is input by means of an image input device, such as a communications interface 70 as illustrated in FIG. 7 (step S12).

The input image is stored temporarily in the image memory 74 after performing prescribed processing, such as color conversion and UCR processing (for converting the RGB data into KCMY data), and the image data is analyzed in the form of rasters following the direction indicated by the arrow in FIG. 12. Consequently, the ink recording rate of the image is determined (step S14). A commonly known method is used to the determine the ink recording rate in step S14.

Furthermore, in addition to finding the ink recording rate, the spatial frequency component is calculated for each block containing a pixel under examination (block under examination) (step S16), and as shown in FIG. 13, if it is judged that the spatial frequency of the block in question is a medium frequency or high frequency, then the threshold value matrix is replaced with a threshold value matrix corresponding to the spatial frequency of that block.

Here, if mutually adjacent blocks for which the spatial frequency has already been judged belong the same spatial frequency range, then the sequence is devised in such a manner that the adjacent positional relationships between the blocks are preserved (step S18). For example, if the spatial frequency of the block at row 3, column 3 is medium frequency, then the medium-frequency threshold value matrix 202 is set for this block. If the low-frequency threshold value matrix 204 is set for the blocks adjacent to this block on the upper and right-hand sides, then the sub-matrix M11 of the medium-frequency threshold value matrix 202 is set for the block at row 3, column 3. Furthermore, if the spatial frequency of the block at row 3, column 4 is a medium frequency, then the threshold value matrix for this block is rewritten as the medium-frequency threshold value matrix 202. Since the sub-matrix M11 of the medium-frequency threshold value matrix 202 has already been set on the right-hand side of this block, then the sub-matrix M12 of the medium-frequency threshold value matrix 202 is set for the block at row 3, column 4, in such a manner that the adjacent positional relationships illustrated in FIG. 9B are preserved.

When the corresponding threshold value matrices have been determined successively in this way (step S20), then the dot arrangement is determined using the established threshold value matrices (step S22).

In the present example, a mode is illustrated in which the threshold value matrix control table is initialized at step S10, but if the threshold value matrices established for each block are stored in sequence in a storage device and the threshold value matrices are determined in sequence by referring to the threshold value matrices previously established for the blocks stored in the storage device, then the step S10 may be omitted.

Furthermore, when determining the threshold value matrices for each of the pixel blocks, the threshold value matrices of the blocks in the previous line should have been determined, and when initializing the threshold value matrix control table, the blocks of at least two lines should be initialized. In the present example, all of the pixel blocks are set to the low-frequency threshold value matrix 204 when the threshold value matrix control table is initialized, but they may also be set to the high-frequency threshold value matrix 200 or the medium-frequency threshold value matrix 202.

The quantization processing in step S22 may be performed once the threshold value matrices have been determined for all of the blocks, or the quantization processing may be started once the threshold value matrices have been determined for a portion of the blocks.

In the inkjet recording apparatus 10 composed as described above, in the binarization processing which obtains a binary image from a multiple-value image, the base unit of the threshold value matrix which determines the threshold values used in the binarization process is taken to be the high-frequency threshold value matrix 200 which has the smallest size, the medium-frequency threshold value matrix 202 and the low-frequency threshold value matrix 204 are divided up into sub-matrices having this base unit size, and hence the threshold value matrices can be set in sub-matrix units with respect to each of the image blocks. Therefore, it is possible to respond to sudden change in the characteristics of the image 210, such as the spatial frequency characteristics.

On the other hand, if the medium-frequency threshold value matrix 202 and low-frequency threshold value matrix 204 are divided and medium-frequency and low-frequency blocks are situated in a continuous fashion, then the continuous relationship (adjacent positional relationship) between the divided sub-matrices is preserved, and therefore suitable quantization is possible with respect to medium-frequency and low-frequency blocks.

Second Embodiment

Next, a second embodiment of the present invention will be described.

Figure 14A:
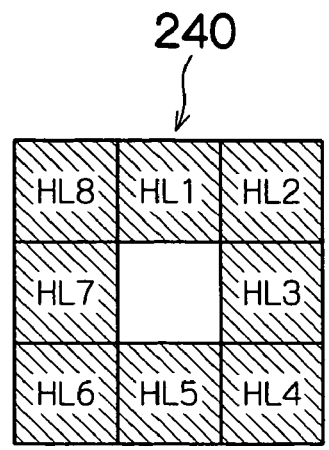
FIGS. 14A to 14C are diagrams showing threshold value matrices used in the image processing apparatus according to a second embodiment of the present invention.
Figure 14B:
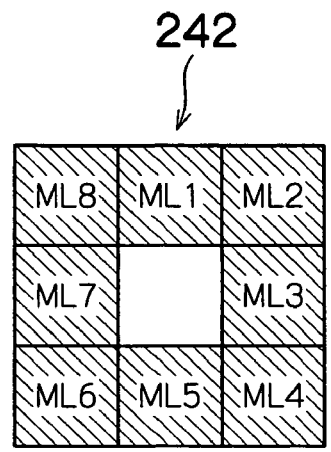
Figure 14C:
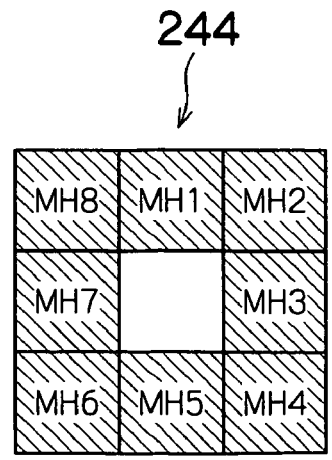

In the present embodiment, in addition to a threshold value matrix as illustrated in the first embodiment described above, suitable threshold value matrices are used in accordance with changes in spatial frequency characteristics in the respective oblique directions, leftwards, rightwards, upwards and downwards. FIGS. 14A to 14C show threshold value matrices according to the second embodiment.

FIG. 14A shows a H/L threshold value matrix 240 used for an image block in which the spatial frequency changes from low-frequency to high-frequency; FIG. 14B shows a M/L threshold value matrix 242 used for an image block in which the spatial frequency changes from low-frequency to medium-frequency; and FIG. 14C shows a M/H threshold value matrix 244 used for an image block in which the spatial frequency changes from medium-frequency to high-frequency.

The H/L threshold value matrix 240, the M/L threshold value matrix 242 and the M/H threshold value matrix 244 are divided according to a unit size (sub-matrix) having the size of the high-frequency threshold value matrix 200 shown in FIG. 9A, and are each constituted by 8 sub-matrices which surround (in other words, border) the perimeter of a block for which the high-frequency threshold value matrix 200, or a sub-matrix of the medium-frequency threshold value matrix 202 or a sub-matrix of the low-frequency threshold value matrix 204 has been established.

The high-frequency threshold value matrix 200 or the medium-frequency threshold value matrix 202 or the low-frequency threshold value matrix 204 is established for the block in the central portion of the H/L threshold value matrix 240, the M/L threshold value matrix 242 or the M/H threshold value matrix 244 as illustrated in FIGS. 14A to 14C (this block being the sub-matrix which is not marked with a sub-matrix indicator mark in the drawings).

FIG. 15 shows an image 250 in which an H/L threshold value matrix 240, M/L threshold value matrix 242 and M/H threshold value matrix 244 as illustrated in FIGS. 14A to 14C have been established. In FIG. 15, items which are the same as or similar to those in FIG. 10 are labeled with the same reference numerals and description thereof is omitted here.

In the image 250, the H/L threshold value matrix 240 illustrated in FIG. 14A is established so as to surround the perimeter of the blocks in row 2, columns 3 and 4, for which the high-frequency threshold value matrix 200 has been set, (in other words, two blocks set to the high-frequency threshold value matrix 200 (H11)).

The H/L threshold value matrix 240 is assigned according to the direction of change; for instance, the sub-matrix HL1 of the H/L threshold value matrix 240 is established for the blocks on the upper side of the high-frequency threshold value matrix 200, and the sub-matrix HL5 of the H/L threshold value matrix 240 is established for the blocks on the lower side.

More specifically, the H/L threshold value matrix 240, the M/L threshold value matrix 242 and the M/H threshold value matrix 244 illustrated in FIGS. 14A to 14C are set in such a manner that the correspondences between the upper, lower, right-hand, left-hand and oblique positions are not changed. An order of priority is established for the respective directions, namely, the upward and downward directions, leftward and rightward directions, and oblique directions, and in the present example, priority is given, in descending order, to the upward and downward directions, followed by the leftward and rightward directions, followed by the oblique directions.

For example, if the H/L threshold value matrix 240 is set for the blocks surrounding the high-frequency threshold value matrices 200 of the blocks at row 2, columns 3 and 4, then the block at row 1, column 3 corresponds both to a block above the block at row 2, column 3, and a block obliquely positioned with respect to the block at row 2, column 4. However, since the upward and downward direction has priority, the sub-matrix HL1 of the H/L threshold value matrix 240 is established for that block. Similarly, the block at row 1, column 4 corresponds both to a block obliquely positioned with respect to the block at row 2, column 3, and a block above the block at row 2, column 4. However, since the upward and downward direction has priority, the sub-matrix HL1 of the H/L threshold value matrix 240 is established for that block.

Furthermore, when rewriting the H/L threshold value matrix 240, the process is controlled in such a manner that blocks for which the high-frequency threshold value matrix 200 and the medium-frequency threshold value matrix 202 have been established are not rewritten.

For example, although the block at row 2, column 4 for which the high-frequency threshold value matrix 200 (M11) has already been established is located adjacently on the right-hand side of the block at row 2, column 3, since the high-frequency threshold value matrix 200 has already been set, it is not rewritten with the sub-matrix ML3 of the H/L threshold value matrix 240.

In other words, if special threshold value matrices are assigned to correspond to changes in the spatial frequency, then the rewriting process is controlled (in other words, the recording medium control table is composed) in such a manner that a threshold value matrix is not rewritten in cases where an original region would be eliminated.

In this way, the adjacent positional relationships between the medium-frequency threshold value matrix 202 and the low-frequency threshold value matrix 204 are preserved, and furthermore, between blocks where the spatial frequency changes, the H/L threshold value matrix 240 is set at the perimeter of the block at row 2, column 8 for which the high-frequency threshold value matrix 200 has been established (one block set to the high-frequency threshold value matrix 200), the M/L threshold value matrix 242 is set at the perimeter of the blocks in rows 6 and 7, columns 4 and 5, for which the medium-frequency threshold value matrix 202 has been established, and the M/L threshold value matrix 242 is set at the perimeter of the blocks in rows 6 and 7, columns 10 and 11, for which the medium-frequency threshold value matrix 202 has been established, in accordance with the priority order of the upward/downward direction, followed by the leftward/rightward direction, followed by the oblique direction.

Figure 16:
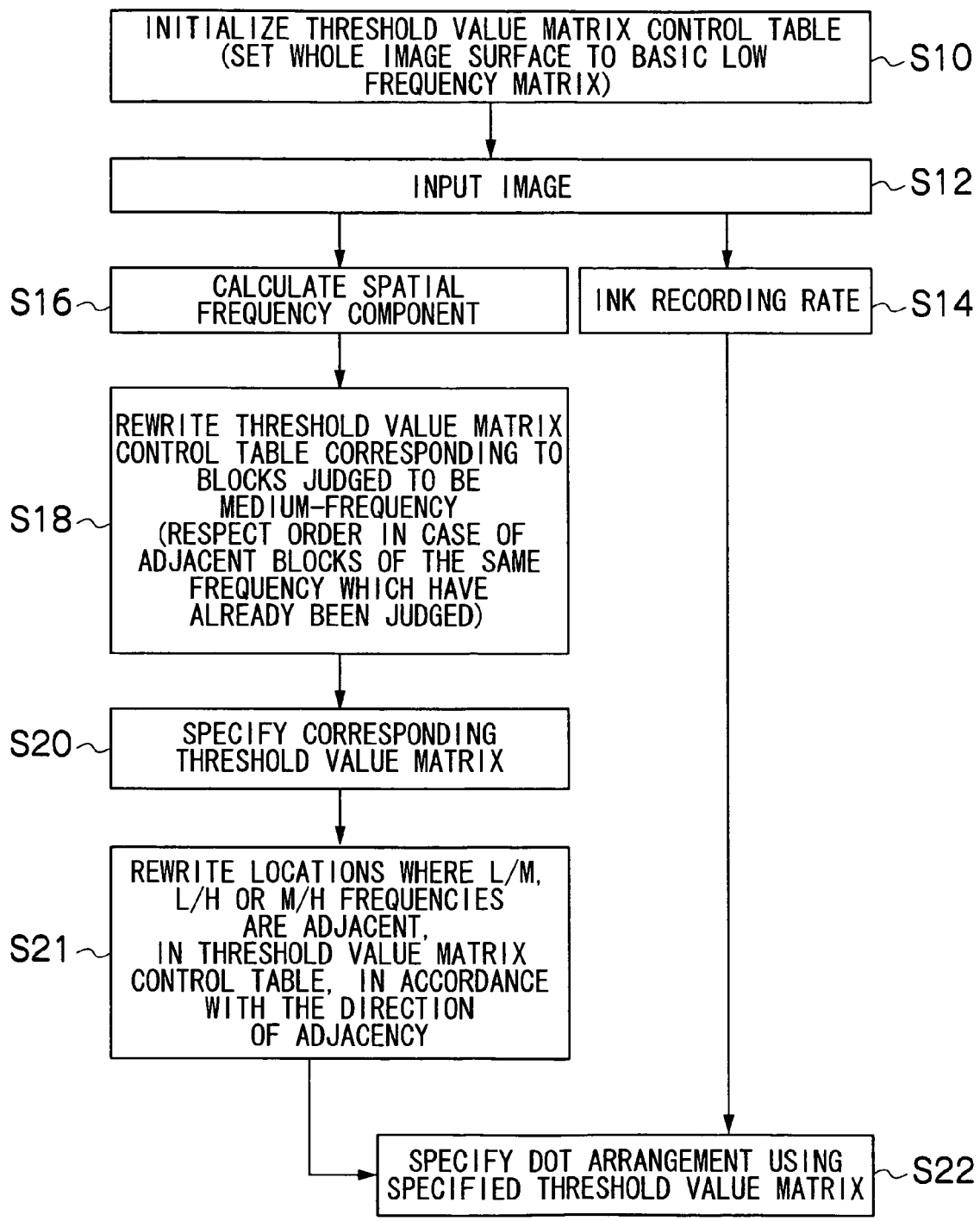
FIG. 16 is a flowchart showing a sequence of image processing according to the second embodiment of the present invention.

FIG. 16 is a flowchart showing the sequence of control of the image processing method according to the second embodiment. In FIG. 16, items which are the same as or similar to those in FIG. 11 are labeled with the same reference numerals and description thereof is omitted here.

In the flowchart of the image processing method according to the second embodiment shown in FIG. 16, the control from step S10 to step S20 is the same as that in the flowchart of the image processing method according to the first embodiment illustrated in FIG. 11, and after deciding the corresponding threshold value matrix at step S20, the threshold value matrices are rewritten using the threshold value matrix control table, at locations where low-frequency/high-frequency, low-frequency/medium-frequency, or medium-frequency/high-frequency are mutually adjacent, in accordance with the direction in which these frequencies are adjacent (step S21).

In other words, the threshold value matrix control table maps the threshold value matrices in accordance with a control priority order, and it further determines regions where the spatial frequency changes. In a block where the spatial frequency (type of threshold value matrix) changes, the threshold value matrix is rewritten with a special threshold value matrix which is suited to the spatial frequency.

Figure 17:
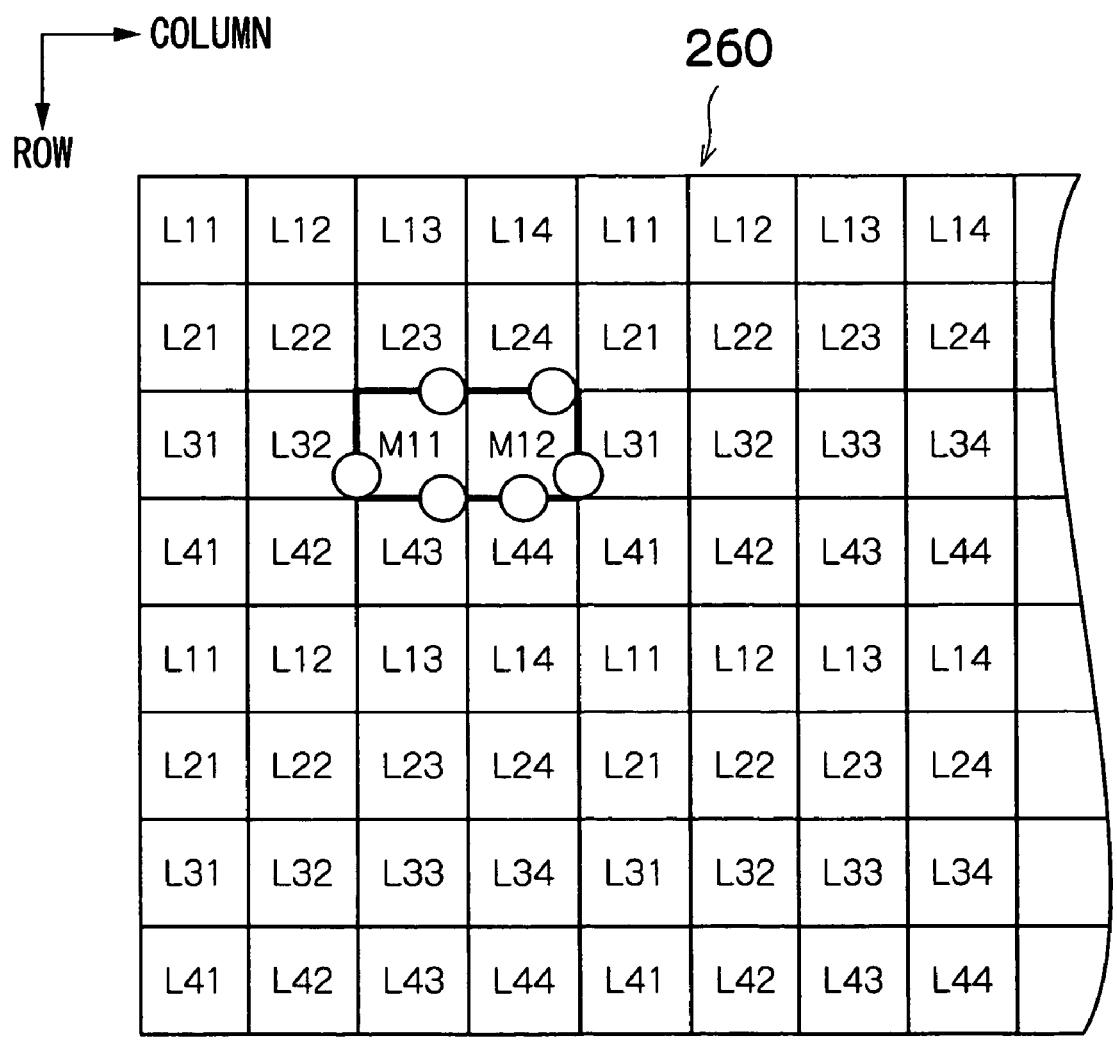
FIG. 17 is a diagram showing a region in which the threshold value matrices illustrated in FIGS. 14A to 14C are used.

In other words, in the image 260 illustrated in FIG. 17, the medium-frequency threshold value matrix 202 is set for the blocks at row 3, columns 3 and 4 by means of step S18 and step S20, and the low-frequency threshold value matrix 204 is set for the blocks which are adjacent to these two blocks in the leftward/rightward directions, the upward/downward directions, and the oblique directions.

The M/L threshold value matrix 242 illustrated in FIG. 14B is established in accordance with the direction of adjacency at the boundaries between the blocks (the locations marked by the O symbol in FIG. 17), and as shown in FIG. 18, in the image 260, a special threshold value matrix is set corresponding to the change in the characteristic quantity of the image (for example, an edge component in the image).

Thereupon, the procedure advances to step S22, and the dot arrangement is specified using the determined threshold value matrix.

Next, a case is described in which the blocks to be rewritten with the H/L threshold value matrix 240, M/L threshold value matrix 242 and M/H threshold value matrix 244 as illustrated in FIGS. 14A to 14C form a special shape, such as a square-U shape, or an central island shape. This explanation refers to FIG. 19 to FIG. 22.

Previously, the H/L threshold value matrix 240, the M/L threshold value matrix 242 and the M/H threshold value matrix 244 have been established after setting the threshold value matrix for each block. A priority order is required in order to carry out processing, and in the present example, the priority is assigned to high-frequency, followed by medium-frequency, followed by low-frequency, in descending order.

(Step 1): At step 1, the threshold value matrix is reset with respect to blocks which are not set to the high-frequency threshold value matrix 200 and which are adjacent to a block set to the high-frequency threshold value matrix 200, which satisfies the condition of having at least one adjacent block in the upward, downward, leftward or rightward directions which is set to a threshold value matrix other than the high-frequency threshold value matrix 200 (namely, the blocks indicated by the horizontal shading pattern in FIG. 19 to FIG. 22). The threshold value matrices are reset according to the block settings (allocation) and the direction of adjacency.

As a result of the aforementioned processing, at least one of the blocks 310, 312, 314 and 316 which are adjacent in the upward, downward, leftward and rightward directions to the blocks 300, 302 and 304 set to the high-frequency threshold value matrix 200 is a block set to a threshold value matrix other than the high-frequency threshold value matrix 200, and hence the blocks adjacent to these blocks are set to the M/H threshold value matrix 244. The processing for block 318 is described hereafter.

The M/H threshold value matrix 244 indicated by MH1 is reset for the block 310 which is adjacent to block 300 in the upward direction, and the sub-matrix MH7 of the M/H threshold value matrix 244 is reset for the block 314 which is adjacent to block 300 in the leftward direction. Furthermore, the sub-matrix MH7 of the M/H threshold value matrix 244 is reset for the block 316 adjacent to block 302 in the leftward direction, and the sub-matrix MH7 of the M/H threshold value matrix 244 is reset for the block 318 adjacent to block 304 in the leftward direction.

Figure 19:
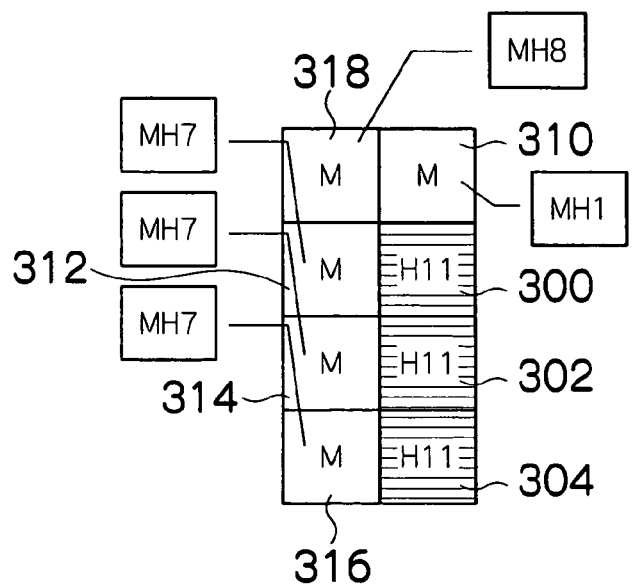
FIG. 19 is a diagram illustrating a case where the block to which the image processing according to the present invention is applied has a special shape.

In other words, as shown in FIG. 19, if there is one threshold value matrix that can be reset in an adjacent block, then the threshold value matrix of that adjacent block is fixed definitively.

Figure 20:
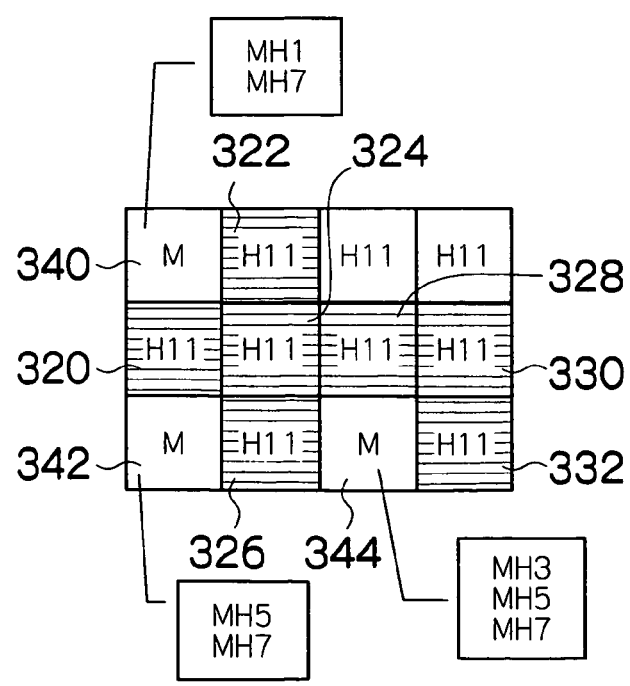
FIG. 20 is a diagram showing one mode of a block to which the image processing illustrated in FIG. 19 is applied.

Furthermore, FIG. 20 shows a case where two or more threshold values can be set in at least one block of the blocks adjacent in the upward, downward, leftward and rightward direction to a block set to the high-frequency threshold value matrix 200, if that block is set to a threshold value matrix other than the high-frequency threshold value matrix 200.

Here, in the case of the blocks 340 and 342 which are adjacent in the upward, downward, leftward and rightward directions to the blocks 320, 322, 324, 326, 328, 330 and 332 set to the high-frequency threshold value matrix 200, there are two blocks which relate to each of these blocks 340 and 342, and in the case of block 344, there are three blocks which relate to this block 344.

The block 340 is adjacent to block 320 in the upward direction and it is adjacent to block 322 in the leftward direction. Therefore, it is possible to set two sub-matrices MH1 and MH7 of the M/H threshold value matrix 244 for the block 340. If the two sub-matrices which can be set have a perpendicular positional relationship in the threshold value matrix in this way, then the block is reset to the sub-matrix MH8 which is adjacent to both the sub-matrix MH1 and the sub-matrix MH7 in the M/H threshold value matrix 244, according to this perpendicular relationship.

Similarly, the block 342 is adjacent to the block 320 in the downward direction and the block 326 in the leftward direction, and it is possible to set two sub-matrices MH5 and MH7 of the M/H threshold value matrix 244 for this block. Since the sub-matrix MH5 and the sub-matrix MH7 have a perpendicular positional relationship, then the block is reset to the sub-matrix MH6 in the M/H threshold value matrix 244 which is adjacent to both the sub-matrix MH5 and the sub-matrix MH7.

Figure 21:
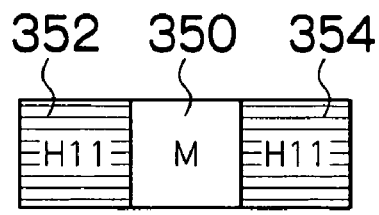
FIG. 21 is a diagram showing a further mode of a block to which the image processing illustrated in FIG. 19 is applied.

Furthermore, in FIG. 21, the block 350 set to the medium-frequency threshold value matrix is located adjacently on the right-hand side of the block 352 which has been set to the high-frequency threshold value matrix, and it is located adjacently on the left-hand side of the block 354 which is set to the high-frequency threshold value matrix.

If the two threshold value matrices (sub-matrices) which can be set for any one block have an opposite positional relationship, then they will cancel each other out mutually, and therefore rather than resetting the threshold value matrix for this block, the original threshold value matrix, the medium-frequency threshold value matrix 202, is left unchanged.

On the other hand, in the case of the block 344 shown in FIG. 20, there are three threshold value matrices which can be set. Block 344 is adjacent on the right-hand side to block 326 which is set to the high-frequency threshold value matrix 200, and it is adjacent on the lower side of the block 328. Furthermore, it is also adjacent to the left-hand side of block 332, and therefore it is possible to assign three sub-matrices MH3, MH5 and MH7 of the M/H threshold value matrix 244.

Here, since the sub-matrix MH3 and the sub-matrix MH7 are located in mutually opposite positions, they cancel each other out, and therefore, the remaining sub-matrix MH5 is reset for the block.

Figure 22:
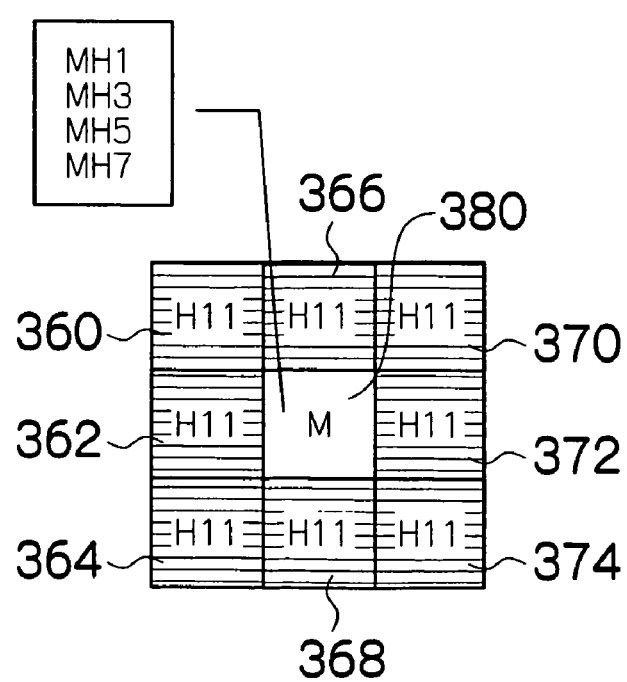
FIG. 22 is a diagram showing yet a further mode of a block to which the image processing illustrated in FIG. 19 is applied.
Figure 23A:
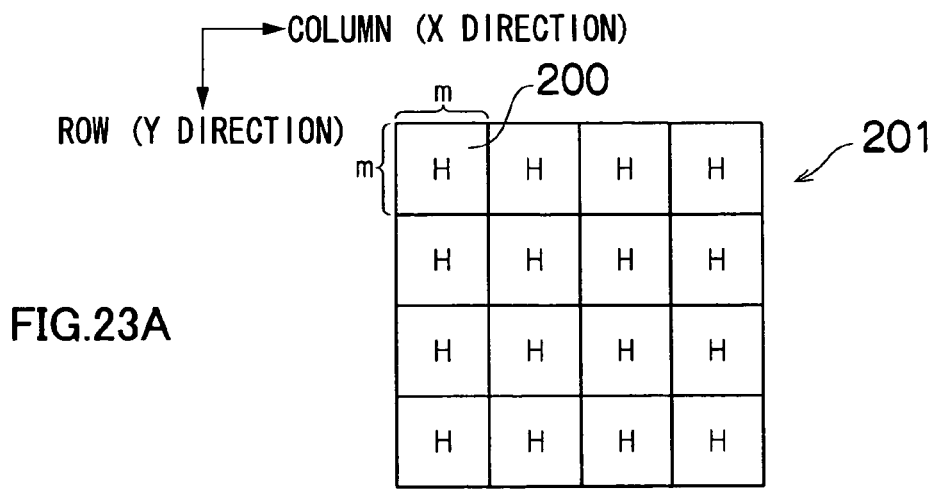
FIGS. 23A to 23C are diagrams for illustrating a conventional threshold value matrix.
Figure 23B:
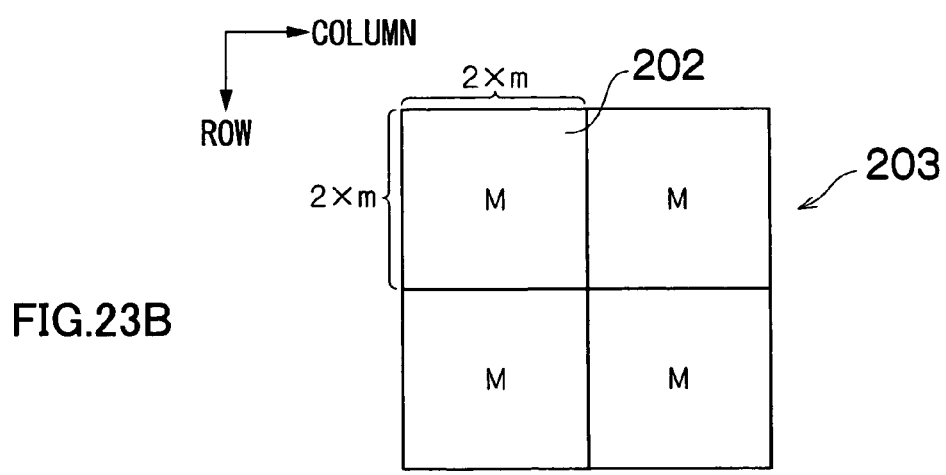
Figure 23C:
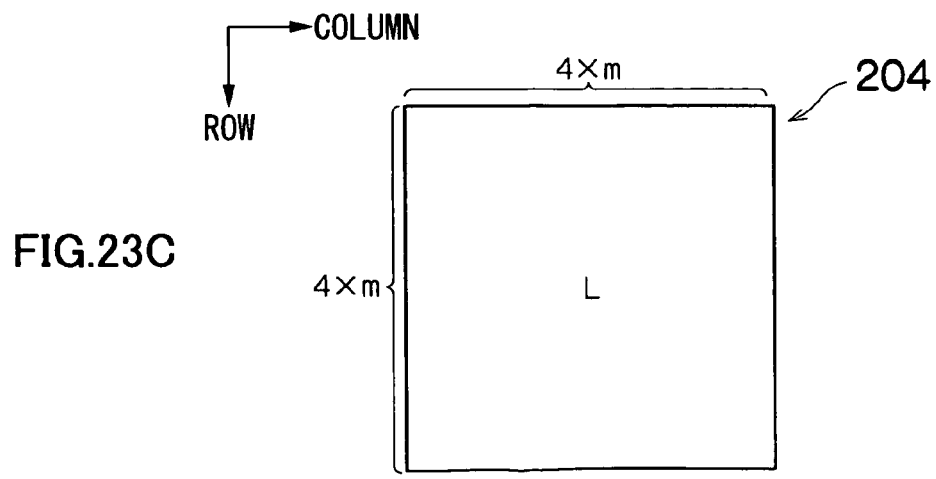

FIG. 22 shows a case where four threshold values can be set for one block. As shown in FIG. 22, the block 380 is surrounded by eight blocks 360 to 374 set to the high-frequency threshold value matrix 200, and it is adjacently respectively to the block 362 in the rightward direction, the block 366 in the downward direction, the block 368 in the upward direction, and the block 372 in the leftward direction. Therefore, four sub-matrices MH1, MH3, MH5 and MH7 could be set for the M/H threshold value matrix 244.

In this case, since the sub-matrix MH1 and sub-matrix MH5, and the sub-matrix MH3 and sub-matrix MH7 are located in mutually opposite positions, then they cancel each other out mutually, and therefore the threshold value matrix is not reset for the block 380 and the original threshold value matrix, the medium-frequency threshold value matrix 202, is left unchanged.

(Step 2): Blocks which are set to a threshold value matrix other than the high-frequency threshold value matrix 200 and which are adjacent to a block set to the high-frequency threshold value matrix 200 which satisfies the condition of having at least one adjacent block in the upper rightward, lower rightward, upper leftward or lower leftward directions set to a threshold value matrix other than the high-frequency threshold value matrix 200, are picked out, and the threshold value matrix is reset for these blocks according to the block settings and the direction of adjacency, with the exception of those blocks for which the threshold value matrix has been reset in step 1 (including those blocks in which the original threshold value matrix has been left unchanged).

More specifically, at step 2, the sub-matrix MH8 of M/H threshold value matrix 244 is set at block 318 shown in FIG. 19.

(Step 3): The blocks set to the high-frequency threshold value matrix 200 and the blocks for which the threshold value matrix has been reset in step 1 or step 2 are excluded from the following processing.

(Step 4): Similar processing to that applied to the blocks set to the high-frequency threshold value matrix 200 in step 1 to step 3 is carried out with respect to the blocks set to the medium-frequency threshold value matrix 202.

(Step 5): When the processing in Step 1 to Step 4 has been carried out, the control sequence terminates.

In the inkjet recording apparatus 10 having the composition described above, since appropriate threshold value matrices are also set for regions where there is change in the image characteristics (spatial frequency characteristics), then the dots are arranged in such a manner that a smooth tonal gradation is obtained.

If the present image control sequence is applied to a color image, then desirably, the color correlation is also determined, and the image is quantized by using a set of threshold value matrices corresponding to the color correlation.

If the image is a high-frequency, gray image, then image resolution can be increased by processing the image so that different ink dots are mutually superimposed, and if the image is a low-frequency, gray image, then tonal gradation can be improved by processing the image so that different ink dots are mutually separated.

If, on the other hand, the image is a high-frequency color image, then the color reproduction and image resolution can both be improved by processing the image in such a manner that dots of different inks are arranged in a mutually proximate fashion.

If the image is a low-frequency color image, then it is possible to improve color reproduction by processing the image in such a manner that the dots of different inks are separated from each other.

In the foregoing description, an inkjet recording apparatus is described as one example of an image forming apparatus, but the scope of application of the present invention is not limited to this, and the present invention may also be applied to various other types of output apparatus, such as image forming apparatuses which represent tonal graduation by means of dots, for instance, a thermo-autochrome (TA) printer, a dye sublimation printer, a laser printer, or the like, or display apparatuses.

Furthermore, the image processing apparatus according to the present invention is not limited to a mode where it is incorporated into an image forming apparatus, such as an inkjet recording apparatus, and it may also be realized by means of a computer. A program for realizing the aforementioned image processing functions in a computer can be stored of a CD-ROM, a magnetic disk, or other information storage medium, and the program may be provided to a third party by means of such an information storage medium, or a download service for the program may be offered by means of a communications circuit, such as the Internet.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image processing method in an image processing apparatus for obtaining a quantized image from a multiple tone image, the method comprising:
   an image dividing step of dividing an input image into a plurality of image blocks of a unit block size by a processing unit;
   a threshold value matrix specification step of specifying threshold value matrices by a threshold value matrix specifying unit for the input image with respect to each of the image blocks from a plurality of threshold value matrices including a first threshold value matrix having the unit block size and a second threshold value matrix dividable into a plurality of sub-matrices each having the unit block size;
   a threshold value matrix setting step by a threshold value matrix setting unit of setting threshold value matrices and the second threshold value matrix in image blocks for which the second threshold value matrix has been specified as the threshold value matrix, in such a manner that adjacent positional relationships between sub-matrices formed when the plurality of sub-matrices serve as base units and the second threshold value matrix is divided into sub-matrix units are preserved.

2. The image processing method as defined in claim 1, further comprising:
   a characteristic quantity calculation step of calculating a characteristic quantity of each of the plurality of image blocks,
   wherein the threshold value matrix specification step specifies the threshold value matrix for each of the plurality of image blocks in accordance with the characteristic quantity calculated in the characteristic quantity calculation step.

3. The image processing method in an image processing apparatus as defined in claim 2, wherein the characteristic quantity calculation step calculates the characteristic quantity of each of the plurality of image blocks under examination according to the characteristic quantity of the image block under examination and the characteristic quantities of adjacent image blocks which are adjacent to the image block under examination.

4. The image processing method in an image processing apparatus as defined in claim 2, wherein the threshold value matrix specification step specifies the threshold value matrix of the image block under examination according to the characteristic quantity of the image block under examination as calculated in the characteristic quantity calculation step, and the threshold value matrices set for adjacent image blocks which are adjacent to the image block under examination.

5. The image processing method in an image processing apparatus as defined in claim 2, wherein:
   there is a third threshold value matrix used when there is a difference in the characteristic quantity between adjacent image blocks; and
   the threshold value matrix specification step specifies the threshold value matrix of an adjacent image block as the third threshold value matrix if there is a difference between the characteristic quantity of the image block under examination and the characteristic quantity of the adjacent image block.

6. The image processing method in an image processing apparatus as defined in claim 2, wherein the characteristic quantity of each of the plurality of image blocks which is calculated in the characteristic quantity calculation step includes a spatial frequency obtained by converting the image signal contained in each of the image blocks into a spatial frequency.

7. The image processing method in an image processing apparatus as defined in claim 6, wherein the first threshold value matrix includes a high-frequency threshold value matrix used when the spatial frequency of the image block is a high frequency, and the second threshold value matrix includes a low-frequency threshold value matrix used when the spatial frequency of the image block is a low frequency.

8. An image processing apparatus which obtains a quantized image from a multiple tone image, the apparatus comprising:
   a threshold value matrix storage device which stores a plurality of threshold value matrices including at least a first threshold value matrix having a unit block size and a second threshold value matrix dividable into a plurality of sub-matrices each having the unit block size;
   an image dividing device which divides an input image into a plurality of image blocks of a unit block size;
   a threshold value matrix specification device which specifies threshold value matrices for the input image with respect to each of the image blocks from the plurality of threshold value matrices stored in the threshold value matrix storage device; and
   a threshold value matrix setting device which sets threshold value matrices and the second threshold value matrix in image blocks for which the second threshold value matrix has been specified as the threshold value matrix, in such a manner that adjacent positional relationships between sub-matrices formed when the plurality of sub-matrices serve as base units and the second threshold value matrix is divided into sub-matrix units are preserved.

9. A computer readable storage medium having embodied thereon a computer executable image processing program for obtaining a quantized image from a multiple tone image by a computer, the image processing program comprising:

a first code segment for an image dividing step of dividing an input image into a plurality of image blocks of a unit block size;

a second code segment for a threshold value matrix specification step of specifying threshold value matrices for the input image with respect to each of the image blocks from a plurality of threshold value matrices including a first threshold value matrix having the unit block size and a second threshold value matrix dividable into a plurality of sub-matrices each having the unit block size;

a third code segment for a threshold value matrix setting step of setting threshold value matrices and the second threshold value matrix in image blocks for which the second threshold value matrix has been specified as the threshold value matrix, in such a manner that adjacent positional relationships between sub-matrices formed when the plurality of sub-matrices serve as base units and the second threshold value matrix is divided into sub-matrix units are preserved.

* * * * *